(12) United States Patent
Fosnight et al.

(10) Patent No.: US 11,267,651 B2
(45) Date of Patent: Mar. 8, 2022

(54) SYSTEM HAVING WORKSTATION WITH TOTE RETENTION AND RELEASE MECHANISM

(71) Applicant: ALERT INNOVATION INC., North Billerica, MA (US)

(72) Inventors: William J. Fosnight, Windham, NH (US); Devin Lert, Wakefield, MA (US); John G. Lert, Jr., Wakefield, MA (US); Stephanie Waite, Burlington, MA (US); Julian Warhurst, Portsmouth, RI (US); David Hartnett, Tewksbury, MA (US)

(73) Assignee: Alert Innovation Inc., North Billerica, MA (US)

( * ) Notice: Subject to any disclaimer, the term of this patent is extended or adjusted under 35 U.S.C. 154(b) by 0 days.

(21) Appl. No.: 16/742,119

(22) Filed: Jan. 14, 2020

(65) Prior Publication Data
US 2020/0223630 A1 Jul. 16, 2020

Related U.S. Application Data

(60) Provisional application No. 62/792,793, filed on Jan. 15, 2019.

(51) Int. Cl.
*B65G 1/06* (2006.01)
*B65G 1/04* (2006.01)
*B65G 1/12* (2006.01)

(52) U.S. Cl.
CPC ........... *B65G 1/065* (2013.01); *B65G 1/0464* (2013.01); *B65G 1/12* (2013.01)

(58) Field of Classification Search
CPC ......... B65G 1/065; B65G 1/0464; B65G 1/12
See application file for complete search history.

(56) References Cited

U.S. PATENT DOCUMENTS

| 7,316,536 | B2 | | 1/2008 | Evans et al. | |
| 8,104,601 | B2 | * | 1/2012 | Hayduchok | B07C 7/005 198/347.1 |
| 8,467,897 | B2 | * | 6/2013 | Holmes | G07F 9/026 700/216 |
| 9,815,625 | B2 | * | 11/2017 | DeWitt | B65G 1/137 |

(Continued)

FOREIGN PATENT DOCUMENTS

| FR | 2723574 | 2/1996 |
| JP | 2002154607 | 5/2002 |

(Continued)

OTHER PUBLICATIONS

International Search Report and Written Opinion dated Apr. 21, 2020 in International Patent Application No. PCT/US2020/013727.

(Continued)

*Primary Examiner* — Jonathan Snelting
(74) *Attorney, Agent, or Firm* — Vierra Magen Marcus LLP

(57) ABSTRACT

An automatic storage and retrieval system is disclosed including storage positions for storing containers, a portal and mobile robots for transferring the containers between the storage positions and portal. The portal may include a bot-access side where the mobile robots transfer containers to and from the portal, and a user-access side where users remove items from the containers.

24 Claims, 27 Drawing Sheets

(56) References Cited

U.S. PATENT DOCUMENTS

2016/0107838 A1\* 4/2016 Swinkels ............. B65G 1/0492
                                                          414/273
2017/0260008 A1\* 9/2017 DeWitt ................ B65G 1/1373
2017/0313514 A1    11/2017 Lert, Jr. et al.

FOREIGN PATENT DOCUMENTS

| TW | 201504123 | 2/2015 |
| TW | 201716306 | 5/2017 |
| TW | 201831385 | 9/2018 |

OTHER PUBLICATIONS

Response to Office Action dated Sep. 27, 2021, with English language translation of application and drawings as amended therein, in Taiwan Patent Application No. 109101424.
Office Action dated Mar. 25, 2021 in Taiwan Patent Application No. 109101424.
English language Abstract for TW201504123 published Feb. 1, 2015, also published as TW I627112 on Jun. 21, 2018.
English language Abstract for TW201716306 published May 16, 2017, also published as TW I619660 on Apr. 1, 2018.
English language Abstract for TW201831385 published Sep. 1, 2018.

\* cited by examiner

| STATE MACHINE | STATES | RETURN CODE | BOT MP SENSOR BLOCKED (D) | USER MP SENSOR BLOCKED (A) |
|---|---|---|---|---|
| TOTE FLIPPER 110 | NO ACCESS | 00 | 0 | 0 |
| | BOT ACCESS | 01 | 0 | 1 |
| | USER ACCESS | 10 | 1 | 0 |
| | IN TRANSIT | 11 | 1 | 1 |
| | | | 0 = BLOCKED | 0 = BLOCKED (>=2.3V) |
| | | | 1 = UNBLOCKED | 1 = UNBLOCKED (<2.3V) |

| STATE MACHINE | STATES | RETURN CODE | BOT TP SENSOR BLOCKED (D) | USER TP SENSOR BLOCKED (A) |
|---|---|---|---|---|
| TOTE PRESENCE | NO TOTE | 11 | 1 | 1 |
| | BOT TRANSFERRING | 01 | 0 | 1 |
| | USER TRANSFERRING | 10 | 1 | 0 |
| | IN CENTERED | 00 | 0 | 0 |
| | | | 0 = BLOCKED<br>1 = UNBLOCKED | 0 = BLOCKED<br>1 = UNBLOCKED |

SYSTEM HAVING WORKSTATION WITH TOTE RETENTION AND RELEASE MECHANISM

CROSS-REFERENCE TO RELATED APPLICATION(S)

This application relates to U.S. Provisional Patent Application Ser. No. 62/792,793 entitled "System Having Workstation with Tote Retention and Release Mechanism" and having a file date of Jan. 15, 2019, for all subject matter common to both applications. The disclosure of said provisional application is hereby incorporated by reference in its entirety.

BACKGROUND

Technical Field

The exemplary and non-limiting embodiments relate generally to systems having picking, dispense, tote inducting or removal workstations and automatic storage and retrieval for use in material handling, for example in e-commerce or storage and retrieval.

Brief Description of Prior Developments

Workstation examples may be found in the following U.S. patents and patent publications (which are hereby incorporated by reference in their entireties): U.S. Pat. No. 9,139,363 which discloses an automated system for transporting payloads; U.S. Patent Publication No. US2016/0355337; U.S. Patent Publication No. US2017/0313514; and U.S. Patent Publication No. US2018/0134492.

SUMMARY

The following summary is merely intended to be exemplary. The summary is not intended to limit the scope of the claims.

In accordance with one aspect, an automatic storage and retrieval system is provided having storage shelves for storing containers; mobile robots for transferring containers around within the automatic storage and retrieval system; and a workstation or portal having a first end at which a mobile robot enters the workstation carrying a container, a second end, opposite the first end, at which the mobile robot exits the workstation or portal, a container storage structure having at least one storage shelf for storing the container, the storage shelf having a bot access side and a user access side opposing the bot access side, the storage shelf further having a tote retention and release mechanism, the tote retention and release mechanism having a bot access side flipper arm configured to selectably block the tote from transfer to the bot access side, the tote retention and release mechanism further having a user access side flipper arm configured to selectably block the tote from transfer to the user access side.

In accordance with another aspect, an example is provided in an apparatus comprising a robotic storage and retrieval system having a static picking workstation, tote storage and retrieval and transit decks. The system has bots that autonomously transport totes from the storage and retrieval system to the static picking workstation within the storage and retrieval system. The static picking workstation has a picking area where a user transfers eaches from product totes to order totes in the workstation. The static picking workstation is integrated into the storage system. The workstation has a tote retention and release or flipper mechanism that retains a tote in position until the tote is released for transport to a robot or until the tote is released to a user or vehicle for example, for picking or placing.

DETAILED DESCRIPTION

Embodiments of the present technology will now be described with reference to the figures, which in general relate to a robotic static workstation.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±0.25%. The term static refers to where a Bot deposits a tote to a static position, as opposed to "dynamic" where a tote remains on, and moves with, a bot.

Figure 1:
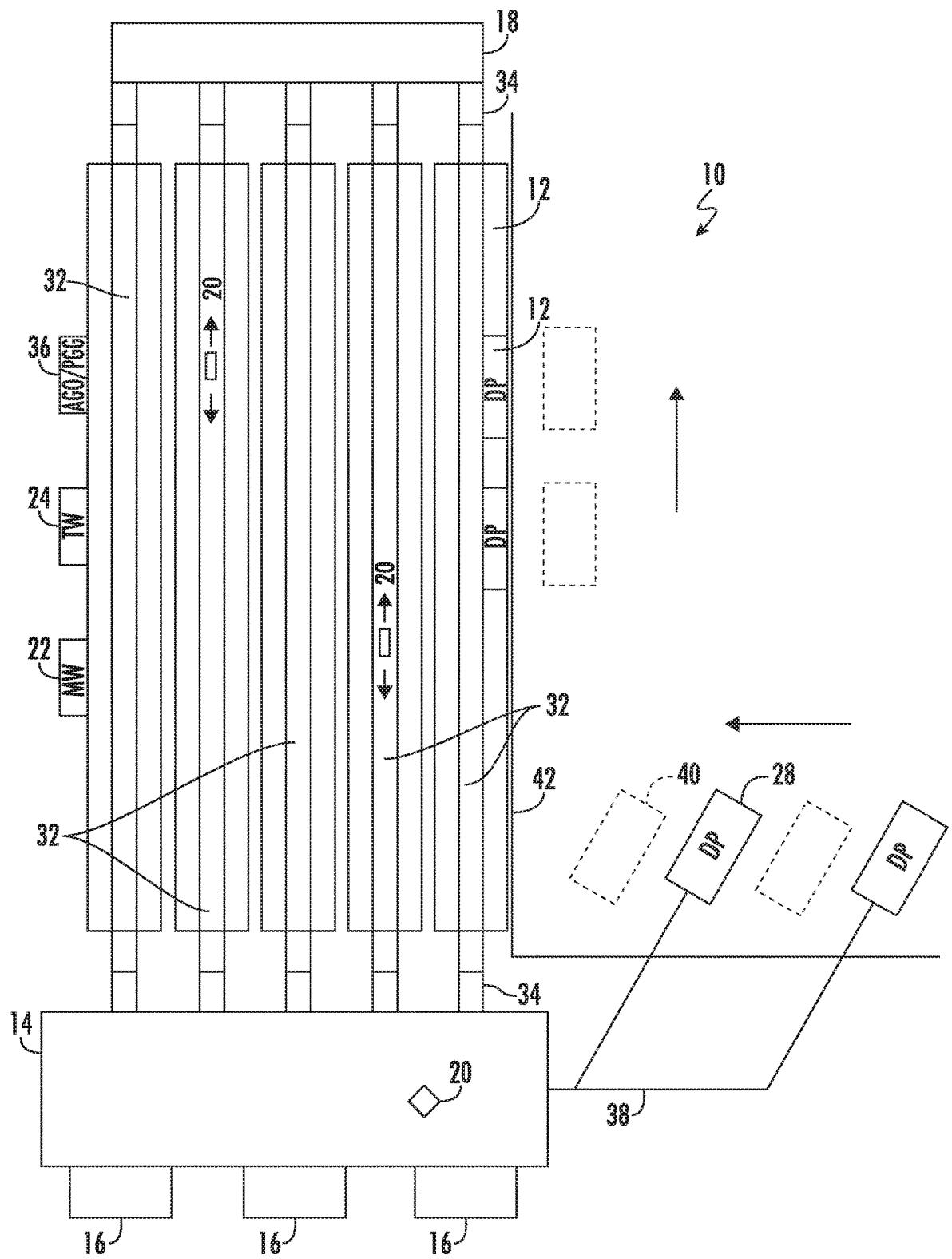
FIG. 1 shows a schematic plan a view of a system having workstations.

FIG. 1 illustrates a schematic plan view of system 10 having picking and dispensing workstations suitable for achieving automated SKU and order storage and retrieval as will be described. The topology of system 10 is intended to be exemplary and more or less sub modules or systems of system 10 may be arranged in any number of ways. By way of non-limiting example, the topology as disclosed in US Patent Publication No. US2017/0313514 or U.S. Patent Publication No. US2018/0134492 which are incorporated by reference herein in their entirety, may be employed, for example where workstations are integrated into the storage and retrieval structure. FIG. 1 shows system 10 plan view with tote storage 12, transit decks 14, manual or robotic dynamic workstations 16, service decks 18, bots 20, manual workstation 22, tote wall 24, AGV/PGV based workstation 36 and dispense portals 26, 28. Tote storage array 12 is shown having five storage aisles 32, and verticals 34 at opposing ends of the aisles although more or less may be provided. Each aisle allows bots 20 to transit from end to end where bots 20 may pick or place totes on opposing sides of the aisle for storage or retrieval. Verticals 34 are provided to allow bots 20 to selectively climb up or down to transit from level to level of storage array 12 or vertically stacked transit decks 14. Each dynamic workstation 16 has aisles or lanes, for example a picking lane, where the order totes are presented by bots or otherwise to a picker that may be an operator or robotic and a placing lane, where order totes are filled with products from the picker to fulfill a given order. Here, product bots flow through and present eaches or subtotes where as soon as the pick is complete, the product bot may exit the workstation 16 and travel to its next storage location. When commanded by MCS 80 (Master Control System), an order bot enters the workstation 16 overlapping the put-away move by the picker or picking robot. Sequencing the flow of bots through the pick may be largely unconstrained by having multiple order totes in multiple dynamic workstations 16 active concurrently. Similarly, MCS 80 may direct product or order totes to workstations or for dispense. For example and as will be described in greater detail, manual workstation(s) 22 may be provided and integrated into the storage structure 12 for functions such as manual picking, tote induction or otherwise. Similarly, tote wall(s) 24 may be provided and integrated into the storage structure 12 for functions such as manual dispense, tote induction or otherwise. Further and as will be described in greater detail, AGV/PGV based workstation 36 may be provided and integrated into the storage structure 12 for functions such as automated dispense, tote induction or otherwise. Further and as will be described in greater detail, dispense portal(s) 26 may be provided and integrated into the storage structure 12 for functions such as manual dispense or otherwise. Alternately, dispense portal(s) 28 may be provided interconnected to storage system 12 by transit rails or decks 38 where, for example, orders may be dispensed through walls 42 to external transit or pickup vehicles 40. In each case, the workstations or portals may incorporate tote retention flipper(s) (tote retention mechanism) controlled by a workstation or other suitable controller to insure totes do not interfere with bot passage through the workstation or portal and further to insure operator access is restricted when appropriate. By way of example, the retention mechanism ensures operator or bot access is allowed, but not both such as for example, prevents operator from pushing tote into path of bot.

Figure 2:
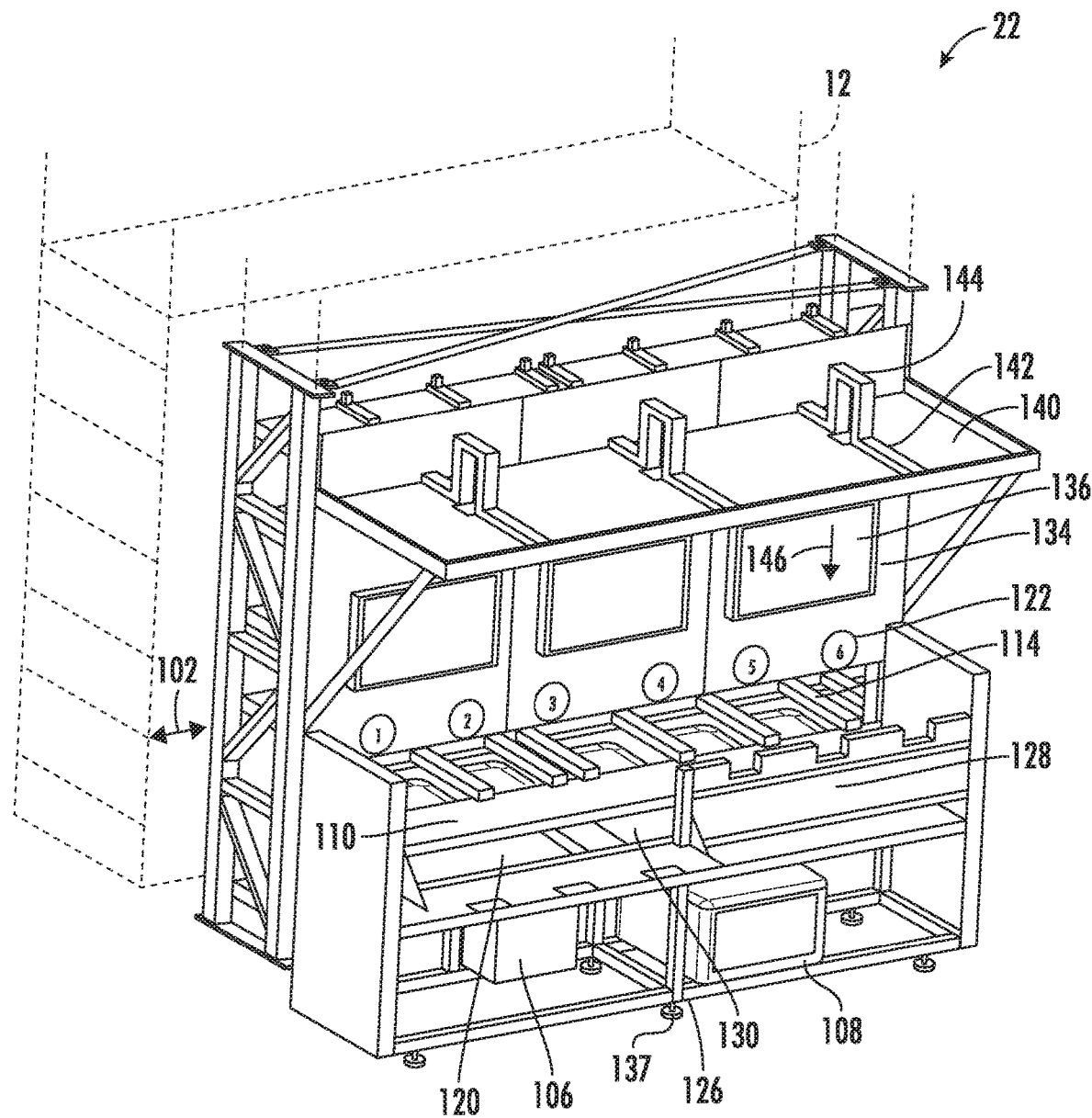
FIG. 2 shows an isometric view of a manual workstation.
Figure 3:
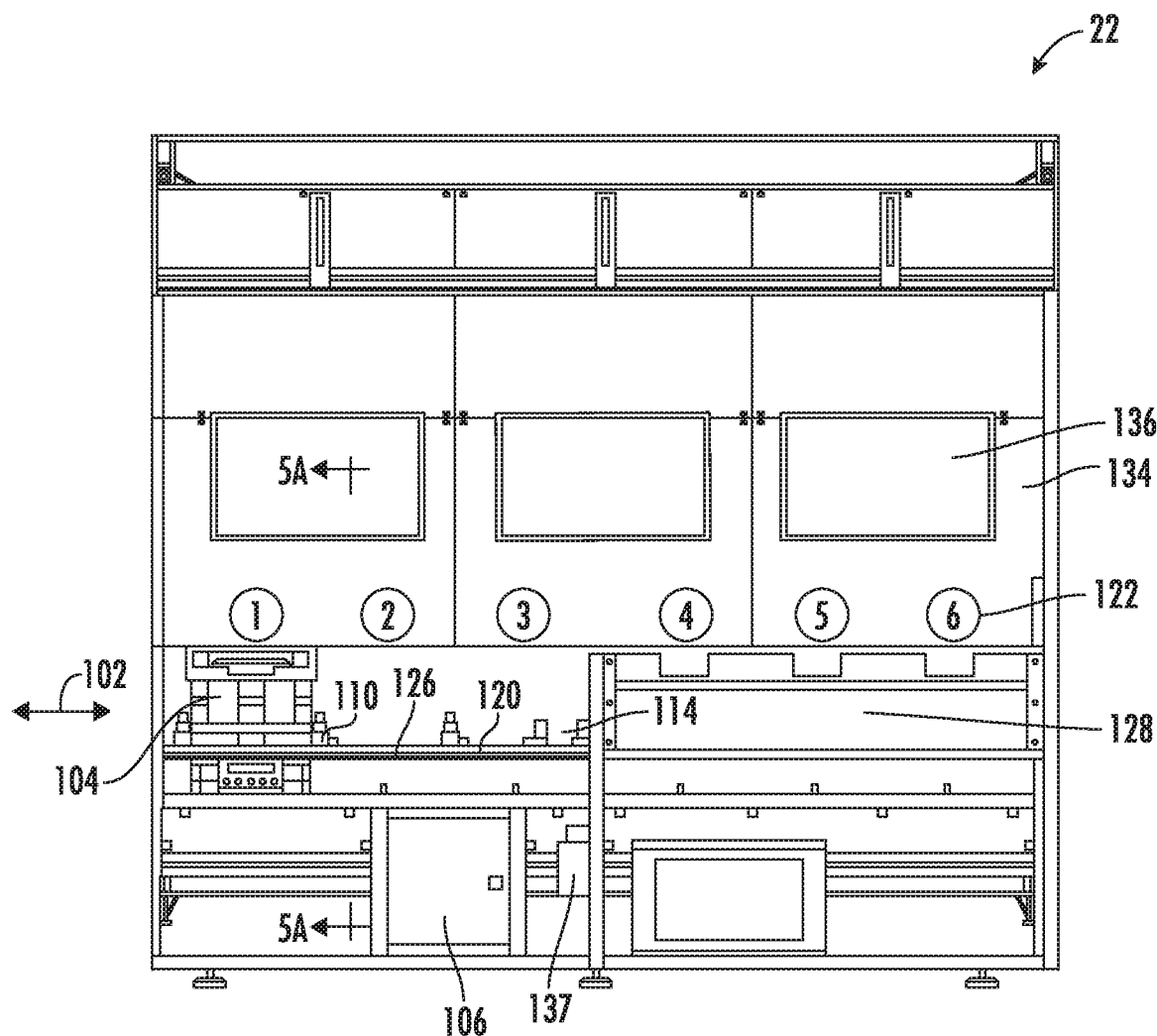
FIG. 3 shows a side view of a manual workstation.
Figure 4:
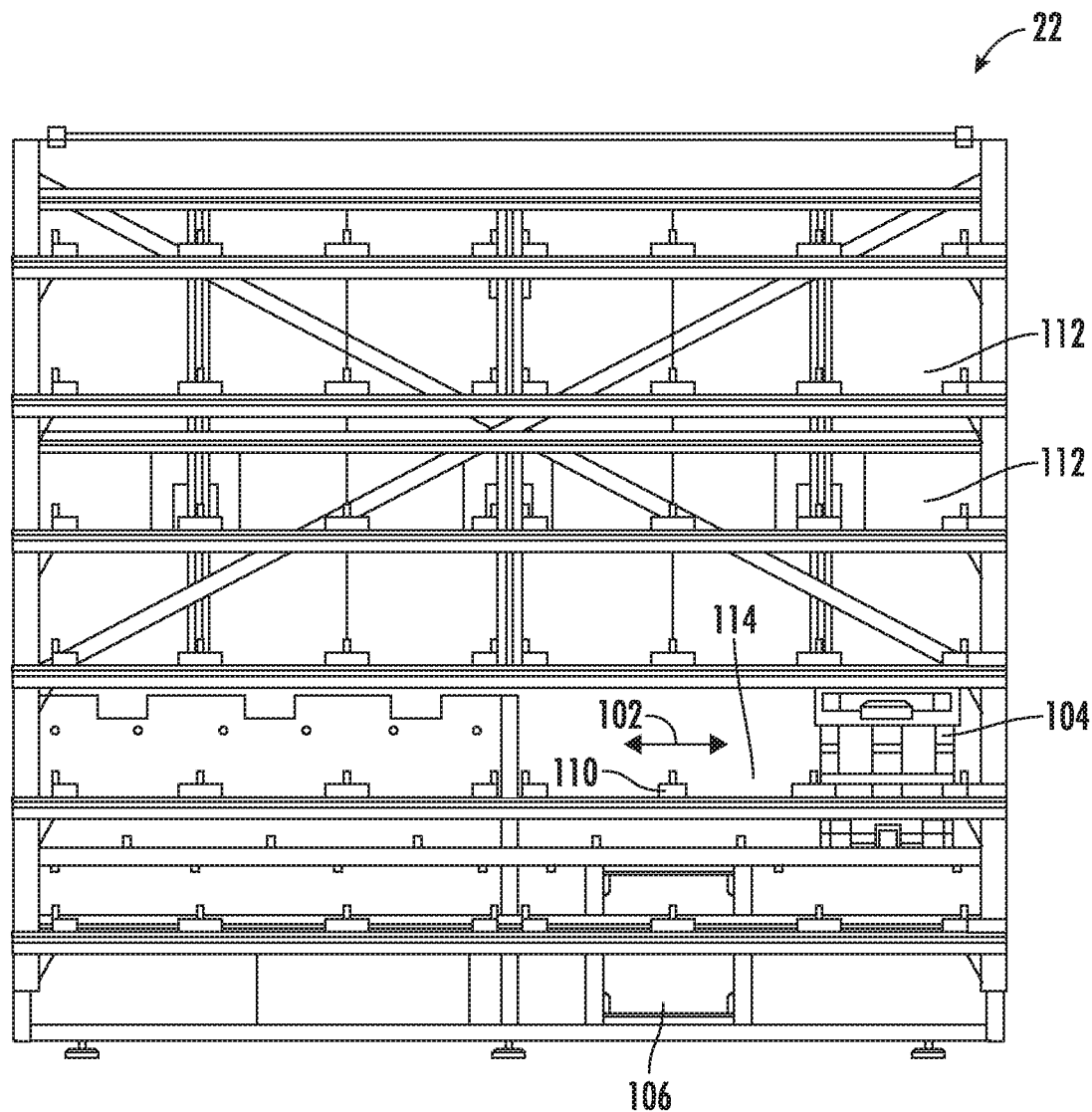
FIG. 4 shows a side view of a manual workstation.

Referring now to FIG. 2, there is shown an isometric view of a static workstation 22 suitable for use in a storage and retrieval system, for example as shown in FIG. 1. Static workstation 22 may be directly integrated within a tote storage structure 12 as shown in FIG. 1 and the features described may be retrofitted to or removed from a storage structure, for example, to add or remove picking or decant (where decant involves the transfer of eaches from manufacturer cases to product totes) capacity to a given storage structure. Referring also to FIGS. 3 and 4, there is shown opposing side views respectively of workstation 22. Workstation 22 is provided to allow totes 104 to go directly into storage without intermediate transport, for example, conveyors or otherwise. As will be described in greater detail, workstation 22 further provides operator access to totes with controlled access and validation of content. Here, a dedicated workstation controller & workstation electrical enclosure 106, 108 may be provided where tote retention and release mechanism 110 incorporating moveable retention flipper(s) may be provided controlled by the dedicated workstation controller 106, 108 to insure totes 104 do not interfere with bot passage through the workstation and further to insure operator access is restricted when appropriate as will be described in greater detail. Workstation 22 has lanes 102, where bots with empty totes, product totes or order totes pass through and transfer totes to be held for storage or access on shelves 112, 114 within workstation 22. On row level 2 there are shown shelves 114 that incorporate the aforementioned tote retention flipper(s) 110 which facilitate user and bot access to the totes on level 2. In alternate aspects, tote access may be provided on any or more than one level. When commanded by MCS, the bot enters the lane 102 and drives forward to position itself next to the target destination tote for picking or target destination tote for placing. In alternate aspects one or more bot enters and/or exits the lane 102 from either direction. Further, lanes above and below lane 102 may be provided to access the shelves 112 for example. Static workstation 22 further has operator access area 120 that is provided to allow a user to remove from or introduce totes to shelves 114 when tote retention and release mechanism 110 incorporating moveable retention flipper(s) releases a tote for removal or opens a shelf for tote induction. In the embodiment shown, 6 shelves 114 are shown each having a dedicated tote retention and release mechanism 110 incorporating moveable retention flipper(s).

Alternately, more or less shelves may be provided. Labels 122 may be provided with indicia, for example 1-6 to identify a given shelf. Left and right tote access doors 126, 128 may be provided with hinges allowing them to be open as shown for 126 to allow totes to be removed or returned to the station 22 by a user. The user access area 120 may be provided with scales 130 such that a tote moved onto a given scale can be dynamically weighed and the corresponding weight profile monitored by controller 106, 108, for example, to verify the contents of the tote placed on the given scale. Further, scale displays and interfaces may be provided (not shown) to display the weight associated with a given scale. An example may include a Doran DS100 digital weight indicator. Panels 134 may be provided for mounting labels 122 and GUI monitors 136. One or more bar code reader(s) 137 (manual and moveable or stationary) may be provided to scan bar codes on totes, eaches or otherwise. Canopy panels 140 may be mounted to frame 142 that also serves as a mount for cameras 144. Cameras and vision subsystems 144 are arranged to look down 146 toward the totes and are provided for multiple vision modes as will be described in greater detail. Although 3 cameras are shown, more or less may be provided.

Vision Modes

In the Static Work Station, the vision subsystem may be used: 1) to verify that a tote is present in the correct location, 2) to verify vs. MCS's data that the correct tote is present, and that it is configured as expected via GRIDs/barcodes, 3) to verify that the tote is in good condition and safe for the system (warp, dirty detection, bale arm positioning, empty), 4) to verify that the associate decants or removes product to the correct location.

Individual operations the vision system may perform include: 1) Camera calibration for determination of camera intrinsics, 2) Stage calibration for manual/automatic determination of the stage/scale location in view, 3) Runtime light calibration that adjusts exposure to fit ambient lighting using the stage edges and screws as a guide, 5) Clear stage detection, for example, is there anything on the stage/scale, 6) Tote presence, position, and alignment, for example, is there a tote in the right place for decant? Here, multiple detection modes may be provided: a) Tote location and angle determination within camera field of view based on contours, b) Which way is the tote positioned? (Alpha or numeric side forward), c) Bale arm hinge position/pose detection, d) Bale arm state detection (is it up? Is it latched properly?), e) Is the tote in a valid position for decant, 7) Obstruction detection (is there a hand sticking into a tote, or another object blocking the camera view?), 8) Subtote configuration detection (results from vision are checked against MCS's expectations)—for example: a) Are there subtotes within a tote? b) Are there bags hung in the tote? c) If so, what type(s) and where is each subtotes located? d) What barcode(s) are associated with each subtote? e) How much are the subtotes expanded?, 9) Empty/dirty/object detection per tote/subtote from a 2D camera, for example: a) Tote/subtote bottom visibility (how much of the bottom of each subtote can we see to check?), b) Stain vs. object classification, and 10) Tote warp calculations (Are the sides of the tote/subtotes warped? If so, how much?)

Static Workstation Modes of Operation

As will be described, workstation 22 may have multiple different modes of operation. Exemplary states or modes may include tote retention flipper states, tote decant/tote load/unload states, tote validation, expiration validation, load product, pull order, load empty tote, load order tote, pull product, pull bagged tote, tote cleaning, cancelled orders, hospital or otherwise.

By way of example, in decant mode, bots may deliver 5 or otherwise any suitable number of totes of various tote types, e.g. containing various sized subtotes where the distribution of tote types may be based on an item database and where one tote position may be held empty for drop off/pickup. Here, tote flipper or tote retention and release mechanism may open the bot-side flipper to receive a tote from the bot. Once the tote is detected in position, the tote flipper may open the user-side flipper for user access. The user may then open a case and scans the product. The MCS may provide item information to the static workstation where the MCS may calculate optimal tote/subtote type based on item dimensions and case quantity for example. Further, if the item has expiration, the static workstation prompts the user to enter expiration dates where the workstation may validate the expiration date. The static workstation may then prompt the user to pull out a tote where the user pulls the tote onto scale. The static workstation may then perform tote validation where the RFID confirms tote ID match, the vision system confirms subtote configuration and subtote ID, the vision system confirms tote bale arms are latched in down position and the scale & vision system both confirm the tote is empty. The static workstation may then prompt the user to load product into specific subtote where the user loads full or otherwise case quantity. The static workstation may validate the quantity loaded based on weight. Here, the static workstation scale may also be used to accurately measure the weight of products with 0.01 lb or other suitable resolution where these weights may then be passed back to the MCS and captured in the database. These accurate product weights may then be used for the following applications by way of example: (a) Future Validation for Loading Product, (b) Item Handling by Automated Picking Robots, (c) Item Handling by Automated Decanting Robots, and/or (d) Item Handling of heavy/light items by mobile robots. Further, the workstation may capture item dimensions on an empty stage/scale if a 3D mapping sensor (not shown) is provided above or next to the 2D RGB camera. If the tote is full, the static workstation prompts the user to push the tote in, the user pushes in tote and the tote flipper closes the user-side flipper where the full tote is ready to be inducted into the storage structure by a bot. Here, a bot may drop off an empty tote before picking up the full tote where the tote flipper selectively opens the bot-side flipper for bot access.

By way of further example, in a dispense mode, a user may enter or type in an order number. Alternately, a user searches all available order numbers and selects one for dispense. Alternately, a warehouse management system (WMS) may notify the MCS of a customer arrival where the MCS forces/directs a dispense to the static workstation (SWS). Here, for dispense mode bots deliver all totes for a given order to the SWS where the SWS prompts the user to pull out one or more totes having eaches corresponding to line items in the order. The user pulls out the given tote(s) to fulfill the order which is validated by the Tote Presence Sensors in the Flipper Mechanism. The SWS may then prompt the user to remove the tote(s) from the shelf. The user then removes the tote(s) from the shelf for dispense which is validated by the Vision Subsystem.

By way of further example, in empty tote induction mode, a user may enter one or more empty totes into the system. Here, the SWS may prompt a user to place an empty tote on a shelf. The SWS may then perform tote validation where RFID validates the known tote (e.g. with no prior identified issues/flags), the scale & vision system both confirm the tote is empty, the MCS chooses a desired tote configuration based on tote watermark levels and if needed, the SWS prompts the user to load subtotes or bags where the user loads the subtotes or bags. Alternately the SWS performs tote validation where the vision subsystem validates the subtote config and if subtotes are present, the vision system confirms the subtote ID. The scale & vision sub systems may the both confirm the tote is empty. The SWS may then prompt a user to push in the tote where the user pushes in tote and The Bot picks up the tote for storage.

By way of further example, in an offline-picked order tote induction mode a user may scan a WMS tote label and also the user scans an Alphabot label. Alternatively an RFID reader can identify the tote if the Tote ID is tracked by the WMS. The WMS may validate the order tote is known, product contents, and temp band. Cold chain compliance of products may further be tracked at the workstation. Here, if a frozen product remains at a chilled workstation for too long, the workstation will direct the user to push the tote in to comply with cold chain rules. This may be used for all operational modes involving a product such as decant. The SWS may prompt the user to push the tote in where the user pushes in the tote.

By way of further example, in a pull product mode a user may select "pull expired product". Alternately, a user searches for product based on a set of criteria or item attributes and selects totes for delivery. Bots then deliver the tote(s). The SWS then prompts the user to pull out the tote and the user pulls the tote out. The SWS performs tote validation and instructs the user to pull out all product from specific subtote where the user removes product from the tote(s). SWS then performs tote validation where the Vision Subsystem validates that product was removed from the correct subtote and scale validates that the correct amount of product has been removed and prompts the user to push the tote in where the user pushes the tote in. Bots may then pick up the tote.

By way of further example, in a cancel orders mode, Bots deliver order tote(s) and product tote(s), for example, one order tote and four empty product totes. The SWS prompts user to pull out totes where the user pulls out a tote. The SWS prompts the user to scan one product from order tote and the user scans product. The SWS instructs the user to place product in an empty product tote and the process is repeated until the order tote is empty and product returned to the ASRS.

By way of further example, in a Hospital mode, Bots deliver tote(s) with reported issues (e.g. flags). The SWS prompts a user to pull out the tote where the user pulls out the tote. The SWS instructs the user to remove all product where the user removes all product. The user may then select "re-use tote" or "change tote". If change tote, the user swaps totes and selects "refresh tote IDs" (thus removing any previously reported flags for the tote) where the SWS instructs the user to scan product and the user scans non-damaged re-sellable product and selects quantity to load. The SWS instructs the user to reload product where the user loads product. If the tote is full, the SWS instructs user to push the tote in.

Figure 5A:
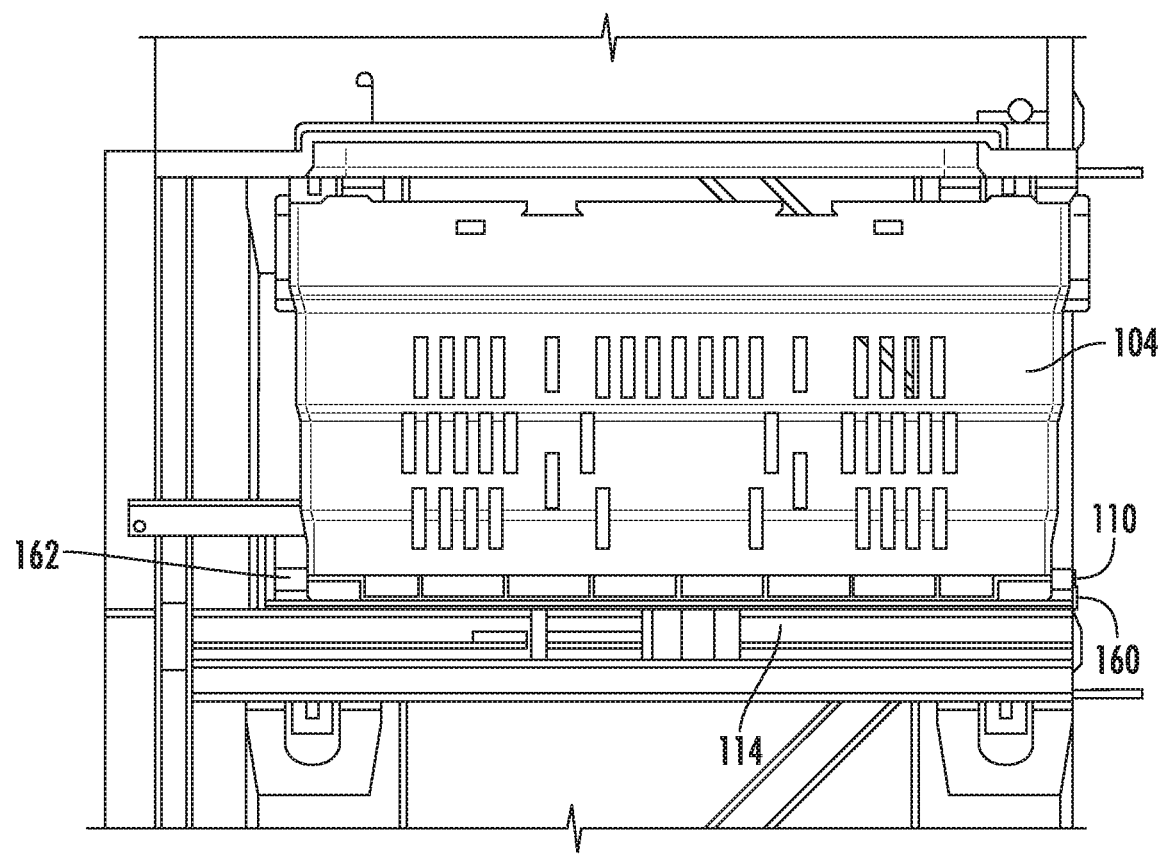
FIG. 5A shows an end view of a tote with a tote retention mechanism for use in a workstation.
Figure 5B:
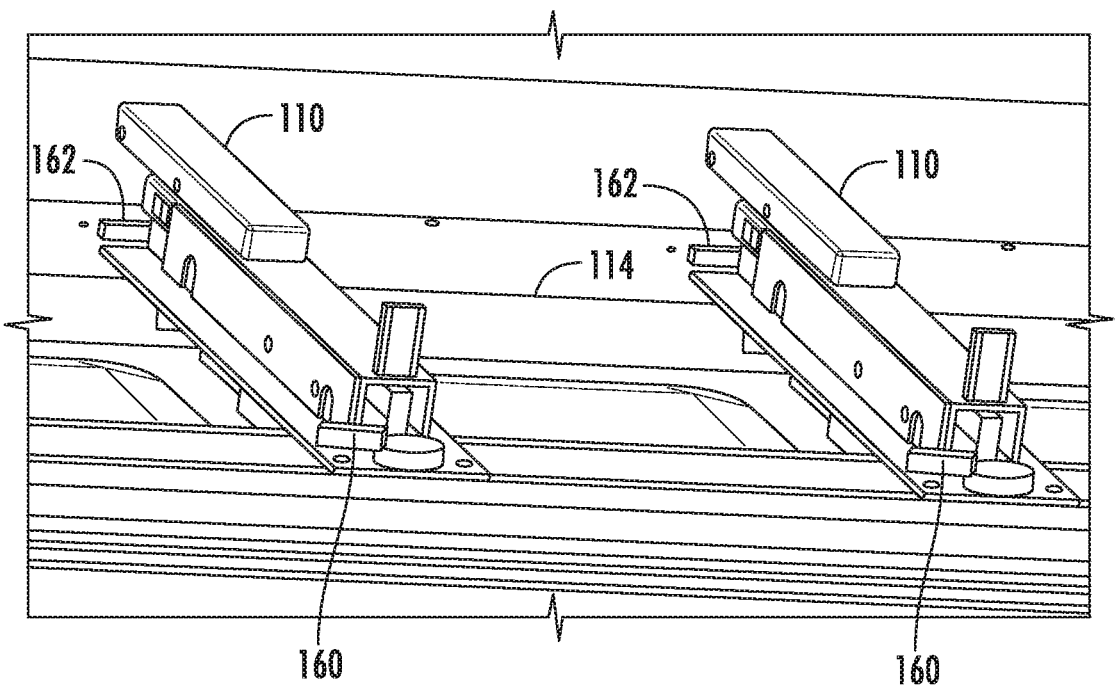
FIG. 5B shows an isometric view of a tote retention mechanism for use in a workstation.
Figure 5C:
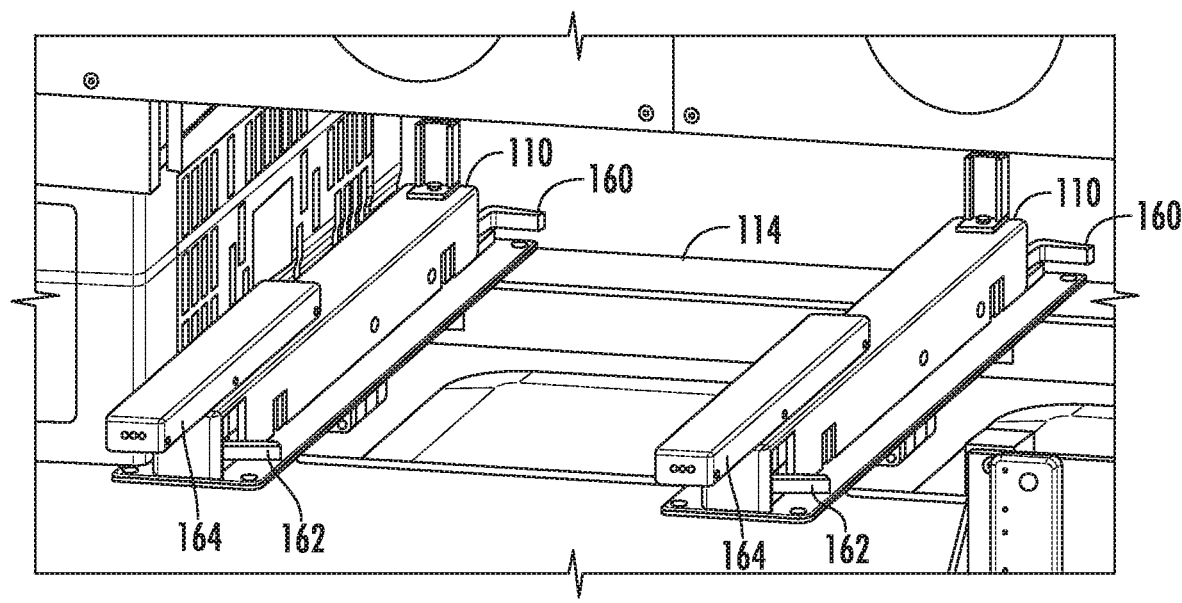
FIG. 5C shows an isometric view of a tote retention mechanism for use in a workstation.

Referring now to FIG. 5A, there is shown an end view of a tote 104 with a tote retention mechanism 110 for use in a workstation on a tote support tray 114. Referring also to FIG. 5B, there is shown an isometric view of a tote retention mechanism for use in a workstation. Referring also to FIG. 5C, there is shown an isometric view of a tote retention mechanism for use in a workstation. Tote retention mechanism 110 has bot side flipper 160 and user side flipper 162 where both are shown extended in FIGS. 5B and 5C. When bot side flipper 160 and user side flipper 162 are both extended, their arms prevent the tote 104 from being moved either to the bot side or the user side. When bot side flipper 160 is retracted, the arm is moved out of the way allowing the tote 104 to be moved past the arm to the bot side. Similarly, when user side flipper 162 is retracted, the arm is moved out of the way allowing the tote 104 to be moved past the arm to the user side. Display 164 is shown for displaying states of the flipper mechanism.

Figure 5D:
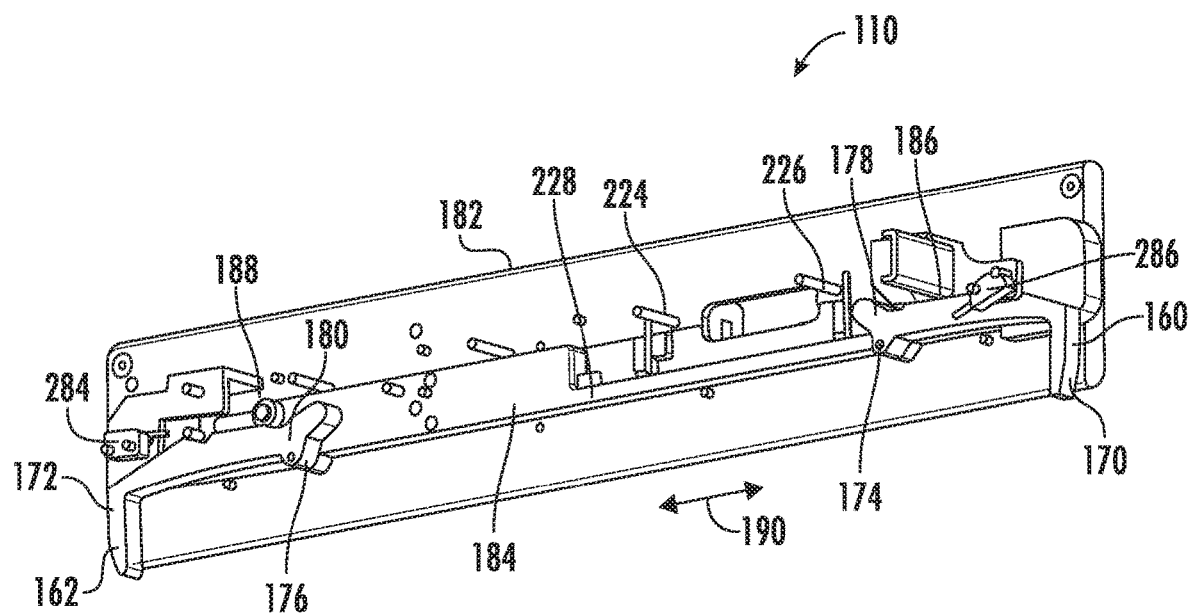
FIG. 5D shows a partial isometric view of a tote retention mechanism for use in a workstation.
Figure 5E:
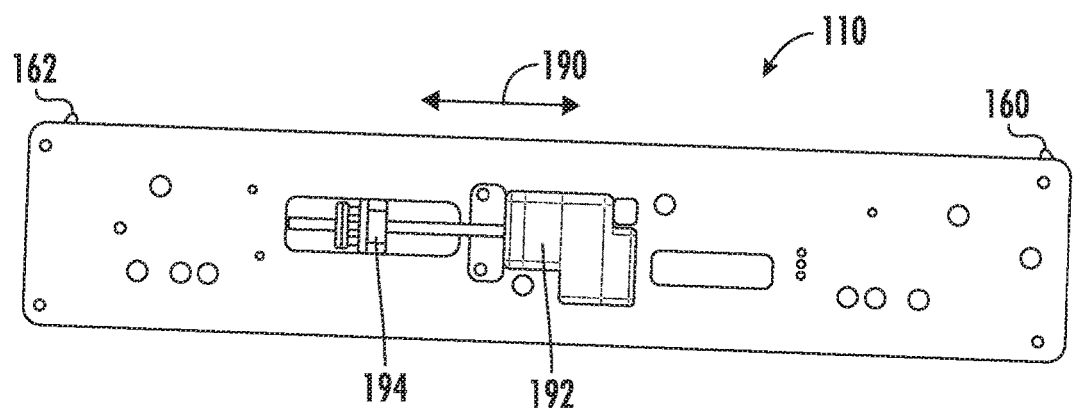
FIG. 5E shows a partial isometric view of a tote retention mechanism for use in a workstation.

Referring now to FIG. 5D, there is shown a partial isometric view of a tote retention mechanism 110 for use in a workstation 22. Referring also to FIG. 5E, there is shown a partial view of a tote retention mechanism 110 for use in a workstation 22. Tote retention mechanism 110 has bot side flipper 160 and user side flipper 162 (both shown in the extended positions in FIG. 5D). Bot side flipper 160 has bot side flipper arm 170, pivot 174 that is stationary with respect to flipper frame 182 and bot side position arm cam 178. Similarly, User side flipper 162 has user side flipper arm 172, pivot 176 that is stationary with respect to flipper frame 182 and user side position arm cam 180. Pinned cam actuator bar 184 is shown having bot side access pin 186 (partly obscured in FIG. 5D) and user side access pin 188. Pinned cam actuator bar 184 is movably coupled to frame 182 and is constrained to slide 190 relative to frame 182 where bot side access pin 186 engages features in bot side position arm cam 178 and user side access pin 188 engages features in user side position arm cam 180. The position of pinned cam actuator bar 184 determines whether bot side flipper 160 and user side flipper 162 are opened or closed depending upon which portion of the arm cam 178, 180 the pins 186, 188 are engaged with. Pinned cam actuator bar 184 can be moved manually or alternately automatically via motor driven lead screw 192 which engages nut 194 coupled to pinned cam actuator bar 184. While pinned cam actuator bar 184 is used to move both flippers 160, 162 between their retracted and extended positions, the flippers 160, 162 may be independently actuated by separate mechanisms in further embodiments.

Figures 6A, 6B:
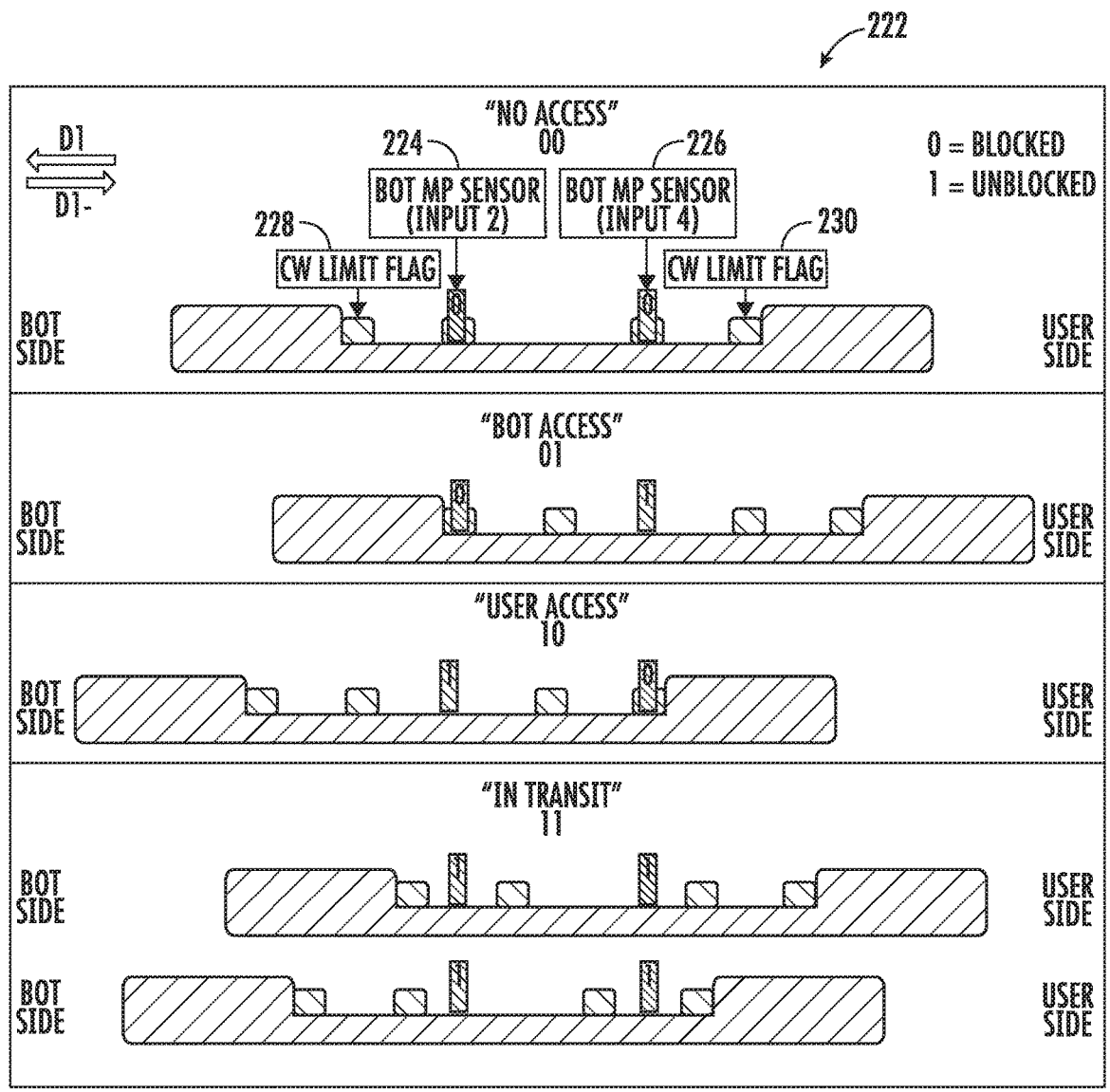
FIG. 6A shows tote retention flipper states.
FIG. 6B shows tote retention flipper states.

Referring now to FIG. 6A, there is shown tote retention flipper states table 220. Referring also to FIG. 6B, there is shown tote retention flipper states table 222. The tote retention flipper states are a function of the position of pinned cam actuator bar 184 which is reflected by the state of bot MP sensor 224, user MP sensor 226, cw limit flag 228 and ccw limit flag 230 where the MP sensors detect a position of the respective flipper and the limit flags detect the limit of motion for the nut. The states shown include states of the flipper 110 as no access, bot side access, user side access and in transit where in transit refers to the state of the pinned cam actuator bar 184.

Figures 7A, 7B:
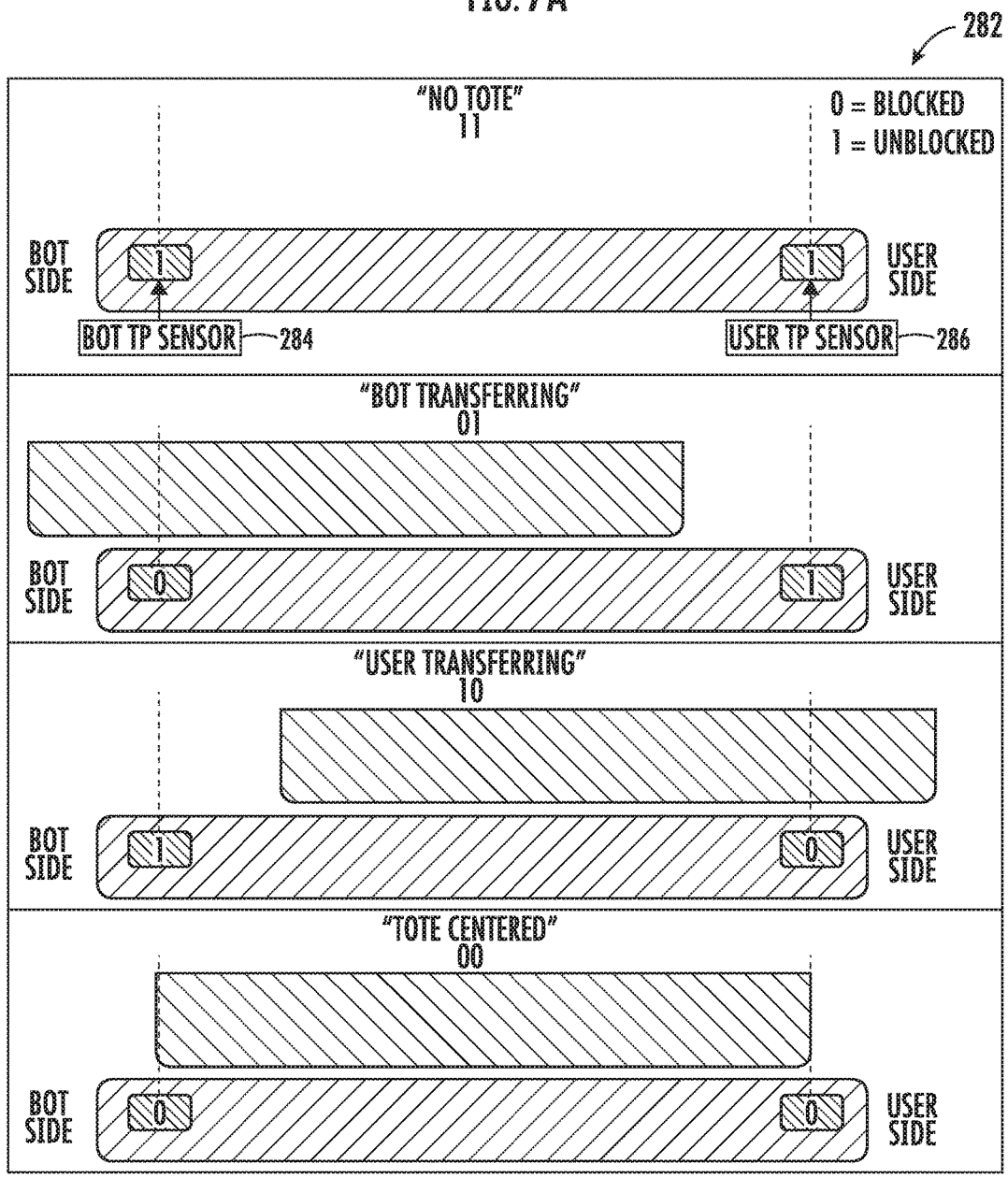
FIG. 7A shows tote presence states.
FIG. 7B shows tote presence states.

Referring now to FIG. 7A, there is shown tote presence states table 280. Referring also to FIG. 7B, there is shown tote presence states 282. Bot TP sensor 284 and user TP sensor 284 may be provided as through beam or other suitable sensors that are blocked by a tote for example. The states shown include no tote, bot transferring a tote, user transferring a tote and tote centered.

Figure 8A:
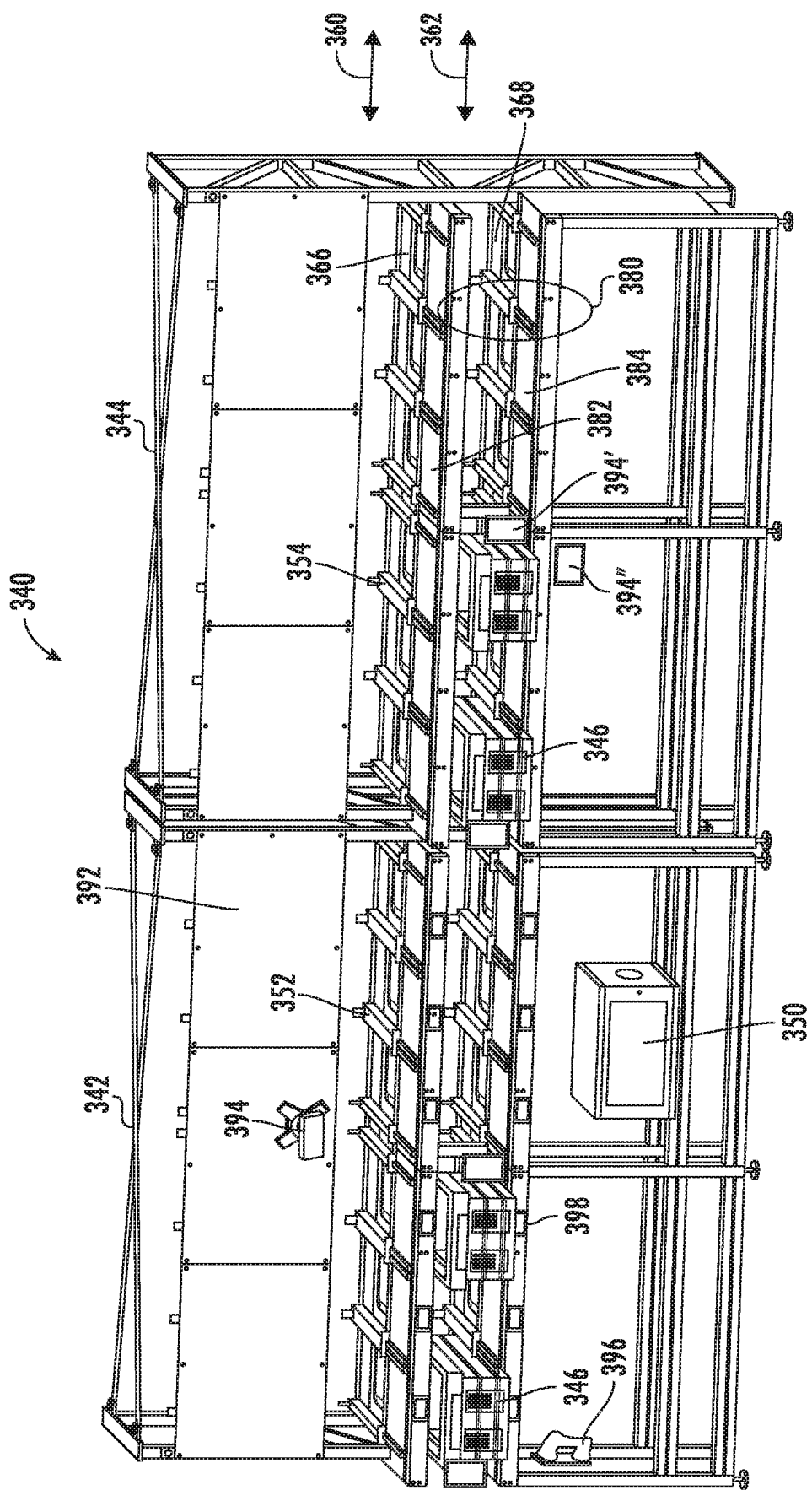
FIG. 8A shows an isometric view of a tote wall station.
Figure 8B:
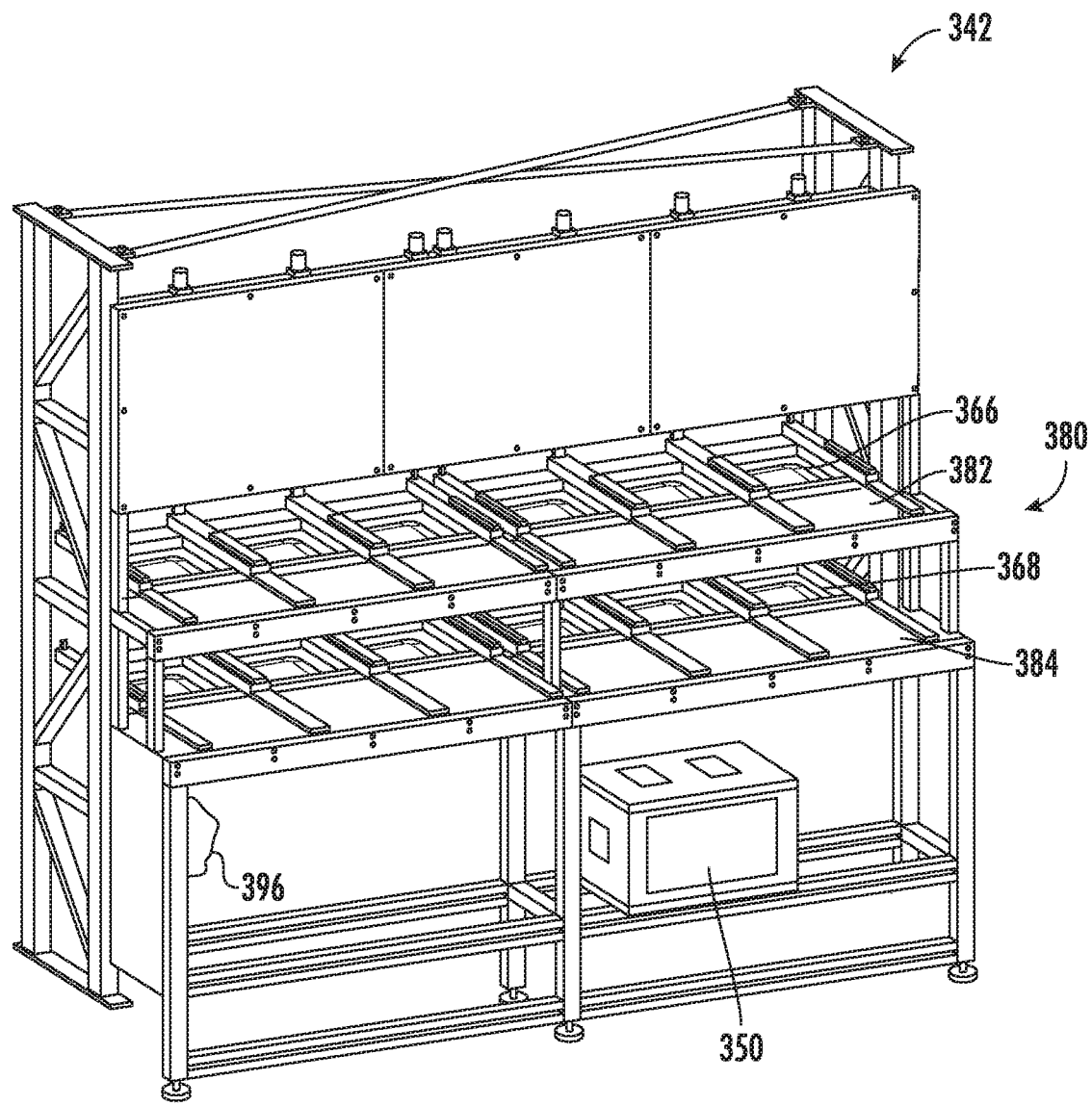
FIG. 8B shows an isometric view of a tote wall station.
Figure 8C:
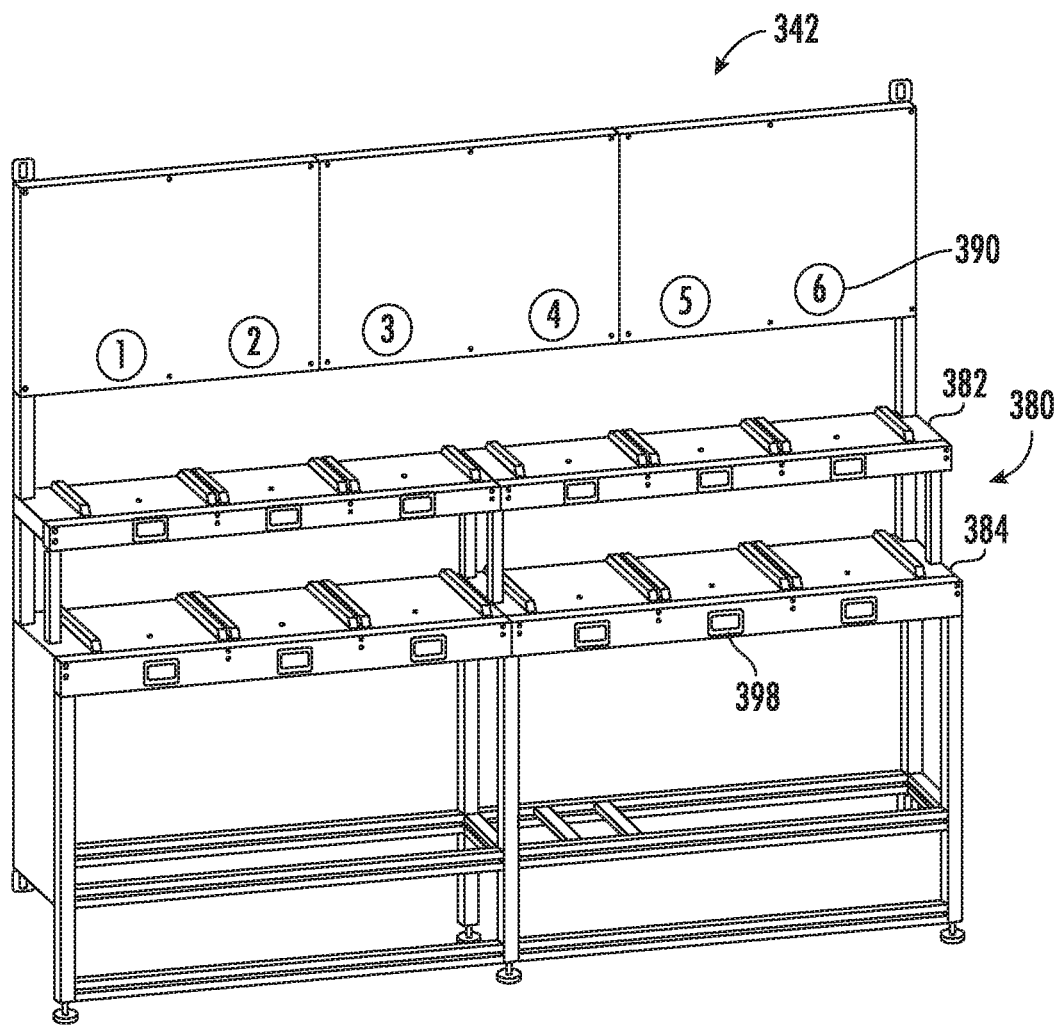
FIG. 8C shows an isometric view of a tote wall station.
Figure 9:
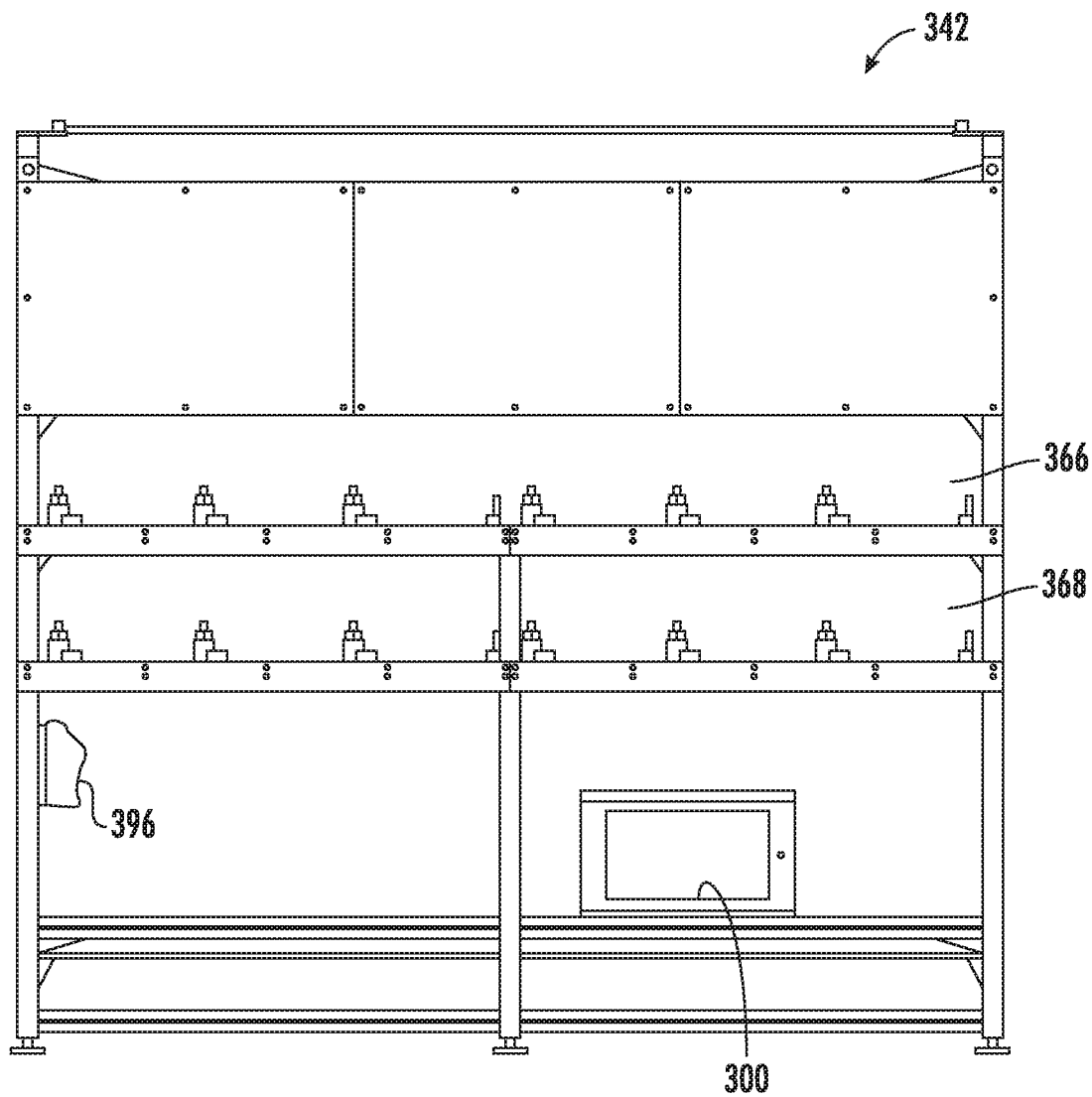
FIG. 9 shows a side view of a tote wall station.
Figure 10:
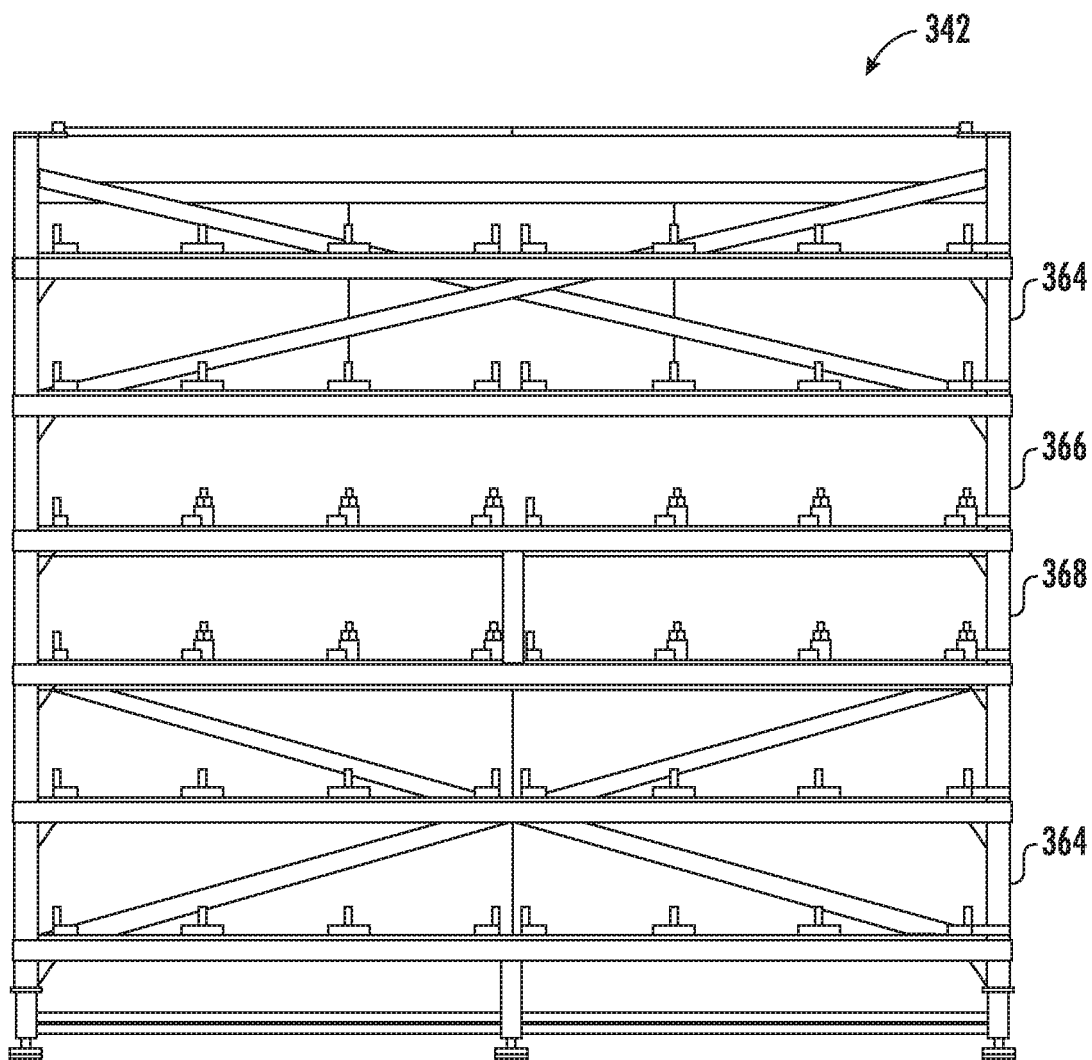
FIG. 10 shows a side view of a tote wall station.

Referring now to FIGS. 8A-8C, there are shown isometric views of a tote wall station 340. Tote wall station is shown having two slightly different tote walls 342, 344. Referring also to FIGS. 9 and 10, there are shown side views of a tote wall station 342. Tote wall station 340 may be directly integrated within a tote storage structure 12 as shown in FIG. 1 and the features described may be retrofitted to or removed from a storage structure, for example, to add or remove capacity to a given storage structure. Workstation 340 is provided to allow totes 346 to go directly into storage without intermediate transport, for example, conveyors or otherwise. Workstation 340 further provides operator access to totes with controlled access and validation of content. Here, a dedicated workstation controller/terminal server 350 may be provided where tote retention and release mechanism 352, 354 incorporating moveable retention flipper(s) may be provided controlled or monitored by the dedicated workstation controller 350 to insure totes 346 do not interfere with bot passage through the workstation and further to insure operator access is restricted when appropriate. Tote retention and release mechanisms 352 and/or 354 may be motorized, but retention and release mechanisms 352 and 354 may be manual in further embodiments. Additionally, flippers 160 and/or 164 may be automatically driven (as by actuator arm 184), but embodiments are possible where moveable retention flipper(s) are manually actuated. Workstation 340 has lanes 360, 362, where bots with empty totes, product totes or order totes pass through and transfer totes to be held for storage or access on shelves 364, 366, 368 within workstation 340. On row level 4 there are shown shelves 366 that incorporate the aforementioned tote retention flipper(s) 352, 354 which facilitate user and bot access to the totes on level 4. Similarly, on row level 3 there are shown shelves 368 that incorporate the aforementioned tote retention flipper(s) 352, 354 which facilitate user and bot access to the totes on level 3. In alternate aspects, tote access may be provided on any or more than one level. When commanded by MCS, the bot enters the lane 360, 362 and drives forward to position itself next to the target destination tote for picking or target destination tote for placing. In alternate aspects one or more bot enters and/or exits the lane 360, 362 from either direction. Further, lanes above and below lane 360, 362 may be provided to access the shelves 364 for example. Tote wall 340 further has operator access area 380 having upper shelves 382 and lower shelves 384 that are provided to allow a user to remove from or introduce totes to shelves 366, 368 when tote retention and release mechanism 352, 354 incorporating moveable retention flipper(s) releases a tote for removal or opens a shelf for tote induction. In the embodiment shown, 6 shelves are shown for each unit 342, 344; each having a dedicated tote retention and release mechanism 352, 354 incorporating moveable retention flipper(s). Alternately, more or less shelves may be provided. Labels 390 may be provided with indicia, for example 1-6 to identify a given shelf. The user access area 380 may be provided with shelves or scales. Panels 392 may be provided for mounting labels 122 and display 394. Alternately display 394' or 394" may be mounted in different locations as shown. One or more bar code reader(s) 396 (manual and moveable or stationary) may be provided to scan bar codes on totes, eaches or otherwise. Dedicated displays 398 may also be provided for each tote storage location.

Tote Wall Modes of Operation:

By way of example, one tote wall mode of operation may include empty tote induction. Here, a user may select mode "Empty Tote Induction". Flippers open or are open on the top shelf where the user places empty totes on the top shelf. The flippers close and the Bot(s) retrieve the tote(s). The flipper then open, user places totes on the top shelf and the process repeated until no totes are left for induction. Here, the GUI requirements include mode selection. Here, the shelf display requirements may display "Insert", "Available", "Busy" or "Disabled".

By way of further example, another tote wall mode of operation may include empty tote retrieval. Here, a user may select mode "Empty Tote Dispense". User side flippers are closed, and Bot side flippers are open, on the top shelf for bot delivery. A Bot delivers a tote. The user side flippers open, and the Bot side flippers close, and a user removes the tote. The user continues to remove totes until the cart is full. Here, all shelves may remain occupied with totes while in the mode. Here, the GUI Requirements may include mode selections. Here, the shelf display requirements may display "Remove", "Available", "Busy" or "Disabled".

By way of further example, another tote wall mode of operation may include dispense. Here, a user may select mode "Dispense". The user logs in and enters OSN. The user side flippers are closed, and the Bot side flippers are open, and the Bot retrieve totes, e.g., from storage array 12, and moves them to a storage shelf 114. Then, the user side flippers open, the Bot side flippers close, and the user removes the tote. The process is repeated with removal until all totes with that OSN have been delivered. The user may be asked if they would like to dispense another order and if not, then the user session may time out. The GUI requirements may include log in, display user name, type OSN and display dispense complete message. The shelf display requirements may include display "Remove", "Done", "Disabled", countdown and tote qty (ex: 1 of 4).

By way of further example, another tote wall mode of operation may include (Order Tote O-Tote) Induction. Here, a user selects mode "O-Tote Induction" and Flippers are closed on the bottom shelf. The user scans WMS label and scans GRID ID. One flipper opens and the user inserts a tote. The flippers close and the Bot verifies that the scanned GRID ID matches RFID read. A Bot then retrieves the tote if it matches and the scanner is ready for the next action. The user then scans another GIF label and GRID ID and the process continues until all totes are inserted into the system. The GUI requirements may include mode selections and exception handling for bad scan(s). The shelf display requirements may include display "Insert", "Available", "Busy" and "Disabled".

Figure 11:
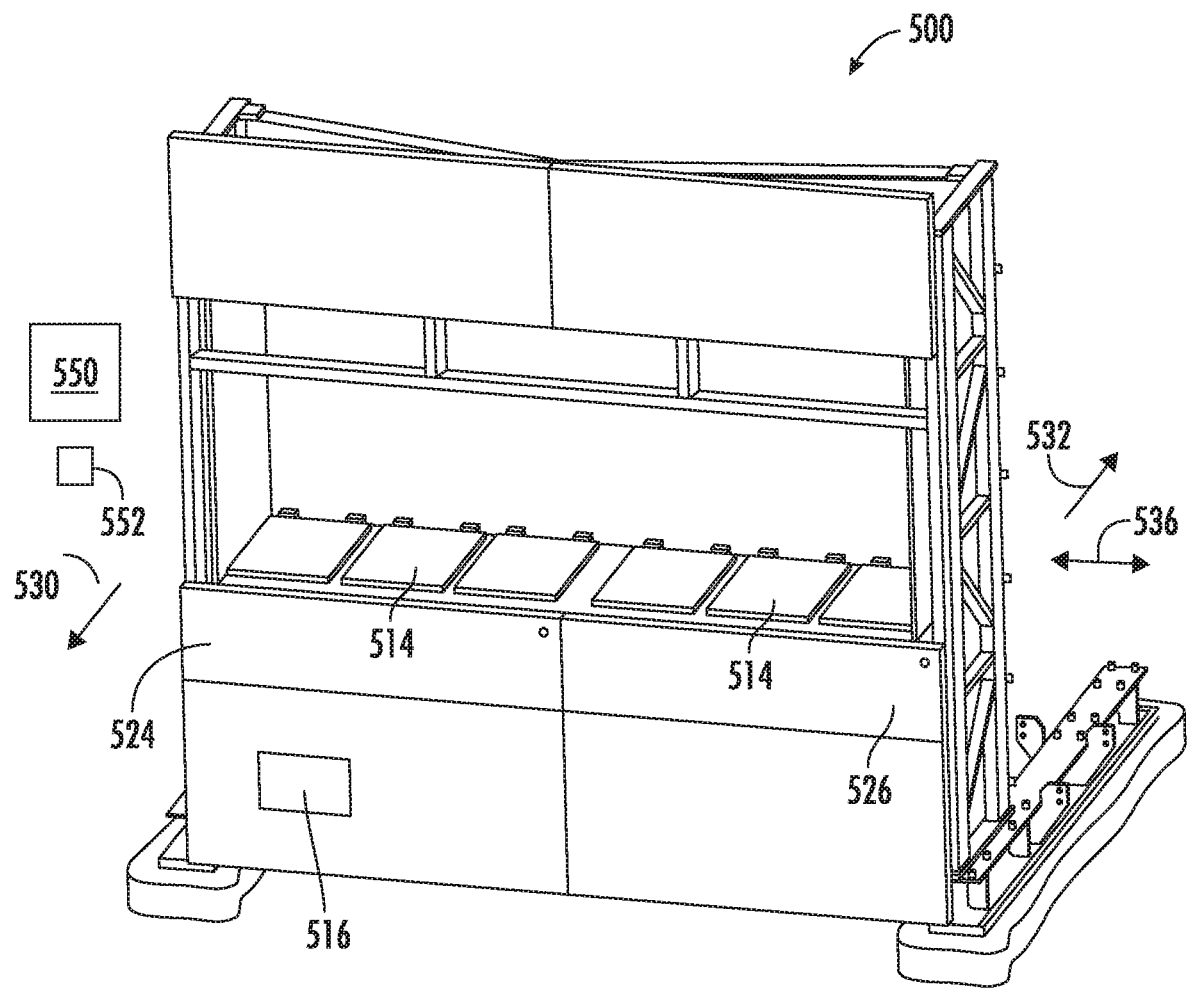
FIG. 11 shows an isometric view of a tote content access portal.
Figure 12:
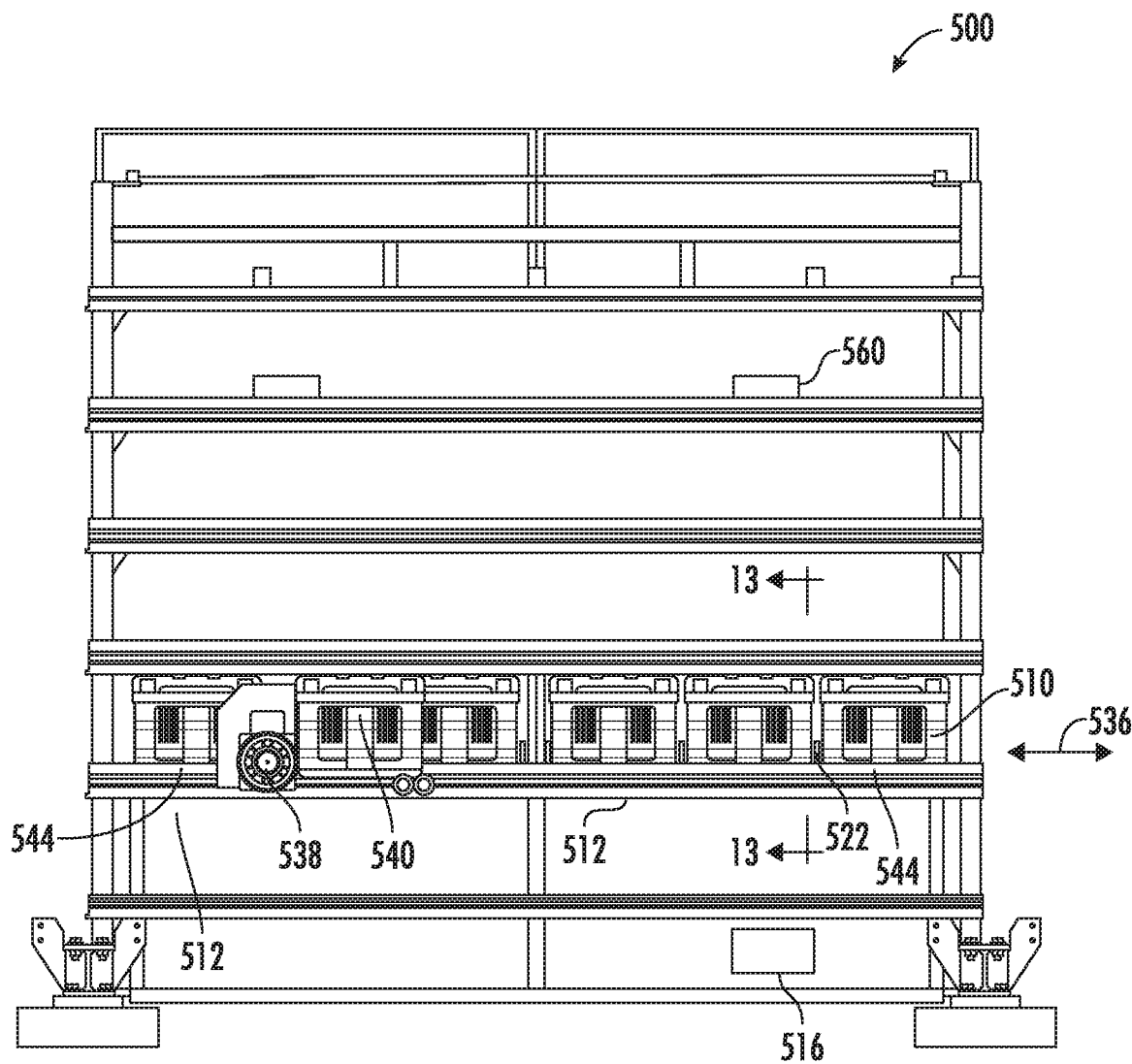
FIG. 12 shows a side view of a tote content access portal.
Figure 13:
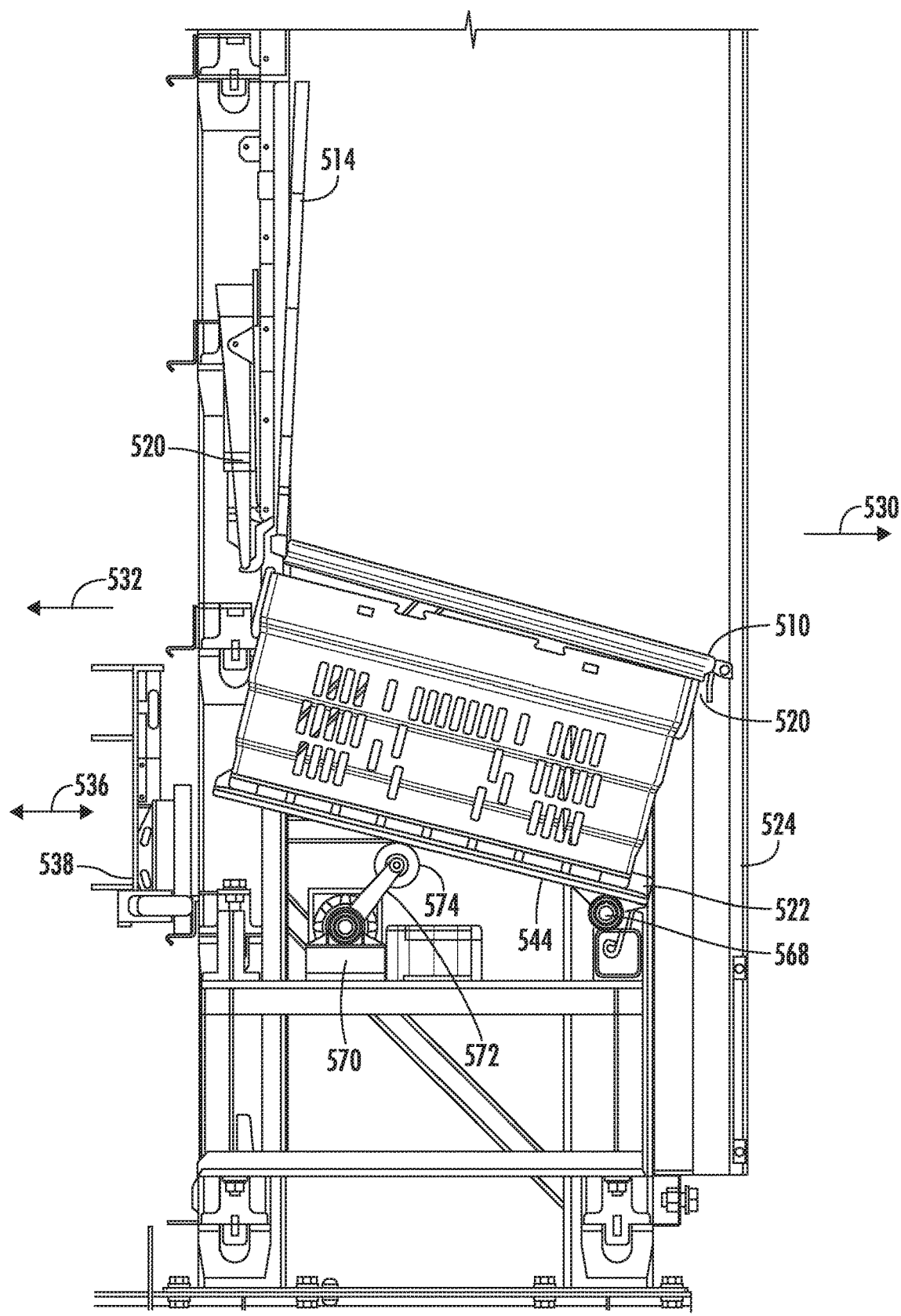
FIG. 13 shows a partial section view of a tote content access portal.

Referring now to FIG. 11. There is shown an isometric view of a tote content access portal 500. Referring also to FIG. 12, there is shown a side view of a tote content access portal 500. Tote content access portal 500 may be suitable for use in a storage and retrieval system, for example as shown in FIG. 1. Tote content access portal 500 may be directly integrated within a tote storage structure or remotely via transit rails or otherwise. Tote content access portal 500 is provided to allow totes with orders fulfilled 510 to be presented for pickup. Portal 500 is shown having 6 tote storage locations 512, each having a dedicated tote cover door 514 that are hinged. A dedicated controller 516 may be provided to control access to each door via electronically controlled latch and opening mechanism 520 at each door. This restricts user access to eaches within totes to those times when totes are appropriately positioned for user access. FIG. 11 further shows panels 524 and 526 through which totes may be inserted and/or removed. This embodiment may further incorporate the tote retention and release mechanisms 522 (FIG. 12). Controller 516 may interface with the tote retention and release mechanisms 522 incorporating moveable retention flipper(s) controlled by the dedicated controller as described above. This ensures totes do not interfere with bot passage through the workstation and further ensures operator access is restricted when appropriate. Hinged access doors 524, 526 may be provided to manually induct or remove totes and for service access. Portal 500 has user access side 530 and bot access side 532. Tote content access portal 500 has lanes 536 where bots 538 with order totes 540 pass through and transfer totes to be held for access on tilting shelves 544 within tote content access portal 500. On row level 2 there are shown shelves that may incorporate the aforementioned tote retention flipper(s) which facilitate user and bot access to the totes on level 2. When commanded by MCS, the bot enters the lane 546 and drives forward to position itself next to the target destination fulfilled order tote for picking or target destination location order for order pickup tote placing. In alternate aspects one or more bot enters and/or exits the lane from either direction. Further, lanes above and below lane may be provided to access additional shelve(s) for example. Tote content access portal 500 has user access area that is provided to allow a user to remove from totes eaches to fulfill a given order. When accessing a given tote, tote retention and release mechanism incorporating moveable retention flipper(s) retains a tote such that the user can't push it manually into the bot operation space or lane. Left and right access doors 524, 526 may be provided with hinges allowing them to be opened to allow an operator to move totes or service the mechanisms inside tote content access portal 500. GUI monitor(s) 550 and scanner(s) 552 may be provided, for example, one or more bar code reader(s) may be provided to scan bar codes on a personal device or otherwise. Overhead panels may be provided, for example at level 5 to mount cameras, lighting cabling and other electronics 560 where cameras may be arranged to look down toward the totes, for example to detect a tote is empty or full or otherwise or at the user and are provided for multiple vision modes. In operation, portal 500 may be bulkhead mounted to a structure such that a customer has access to the user side but not the bot side. In order to pick up an order, the customer identifies themselves at the user interface and the controller directs them to the appropriate door(s) and tote(s), opens them and allows the user to unload the contents to fulfill their order. Upon removal, the controller validates the contents have been taken, closes the door(s) and the MCS dispatches bot(s) to pick up the fulfilled order tote(s) and replace them with the next round of order tote(s) to be picked up by the next customer. Referring also to FIG. 13, there is shown a partial section view of a tote content access portal 500. For ergonomic reasons, the totes 510 presented for customer pickup are tilted. Totes are delivered to shelf 544 by bot 538 where shelf 544 can pitot on bearing 568. Gearmotor 570 is provided with an output shaft coupled to link(s) 572 and roller(s) 574 to allow shelf 544 to pivot as shown in order to resent the totes 510 in a more ergonomically friendly orientation for pickup. Upon user access cylinder or linear actuator 520 opens door 514 by pivoting door 514 up as shown for access.

Figure 14A:
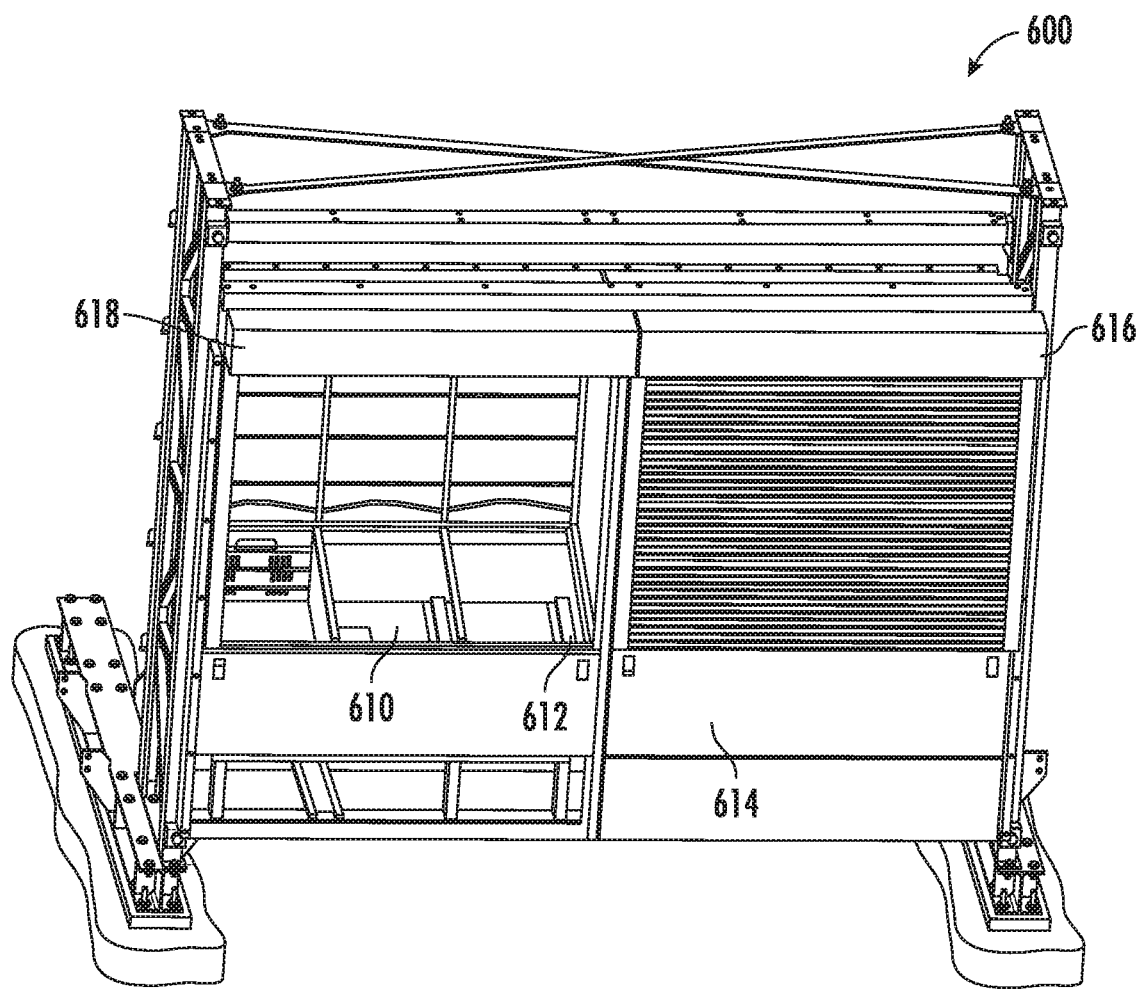
FIG. 14A shows an isometric view of a tote content access portal.
Figure 14B:
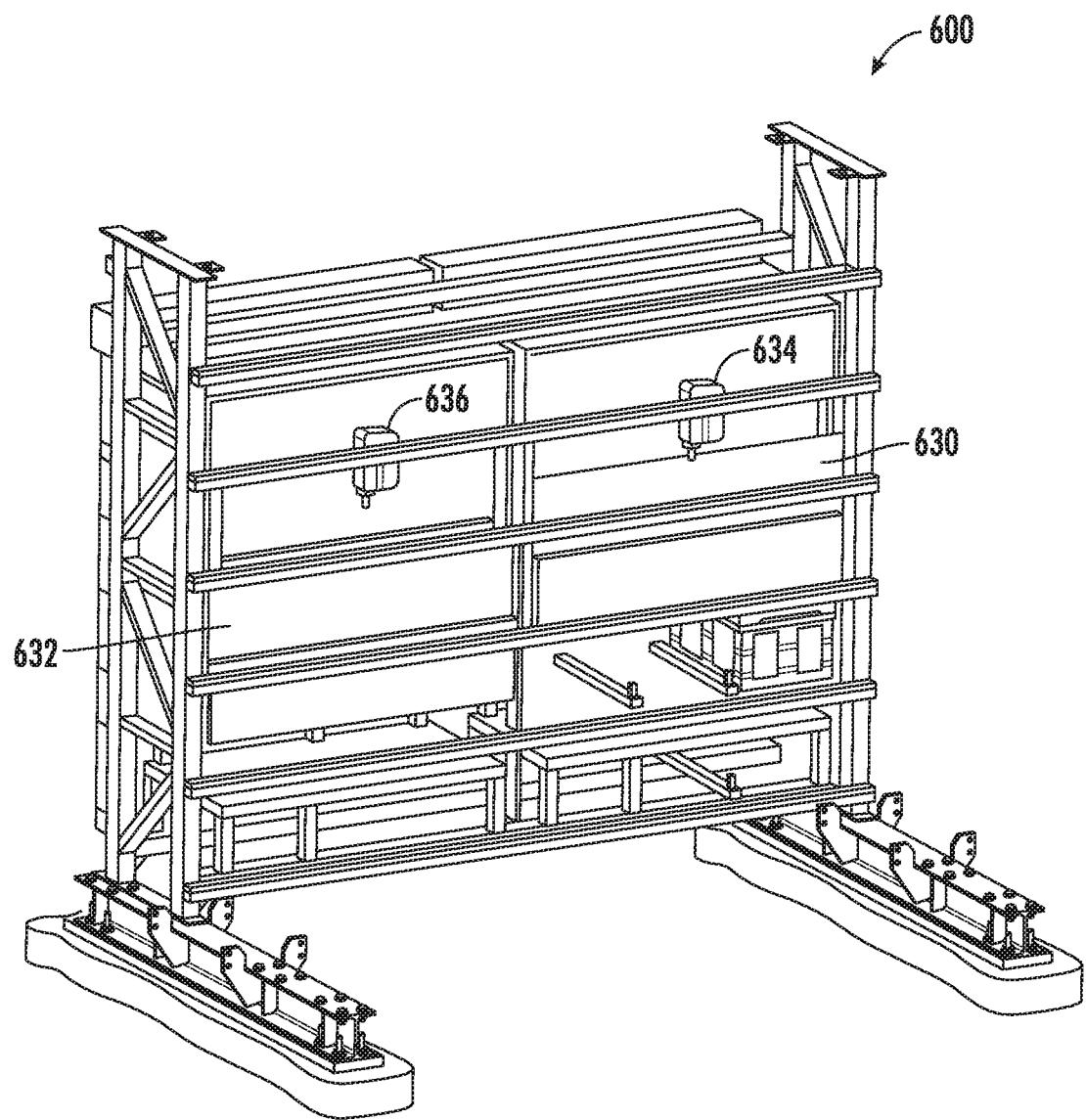
FIG. 14B shows an isometric view of a tote content access portal.

Referring now to FIG. 14A, there is shown an isometric view of a tote content access portal 600. Referring also to FIG. 14B, there is shown an isometric view of a tote content access portal 600. Portal 600 may have similar features to portal 500 such as tilt-able portal base plate 610 and guides 612 and access doors 614. On the user access side, instead of relying on individual doors to access each tote, doors 616, 618 that may selectably be opened or closed are provided for user access to up to 3 totes at a time for order pickup. Although slat based rolling access doors are shown, any suitable door may be provided. On the bot access side, corresponding gates 630, 632 that may selectably be opened or closed with linear actuators 634, 636 to prevent user access to the bot side for safety or other concerns. Here, the gates serve as isolation plates to close off and isolate the bots from the user.

Figure 15A:
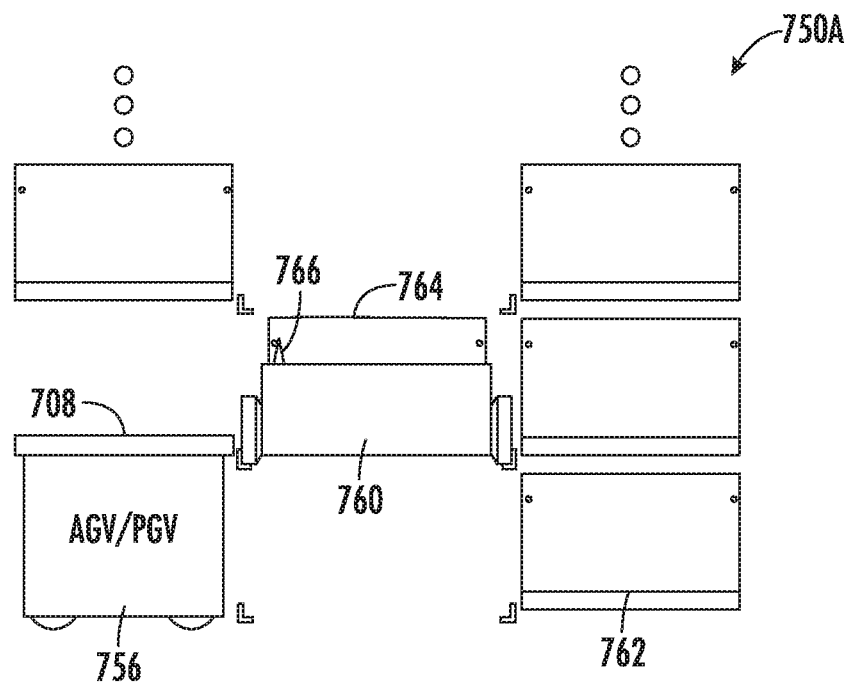
FIG. 15A shows an end view of a guided vehicle interface to storage and retrieval.
Figure 15B:
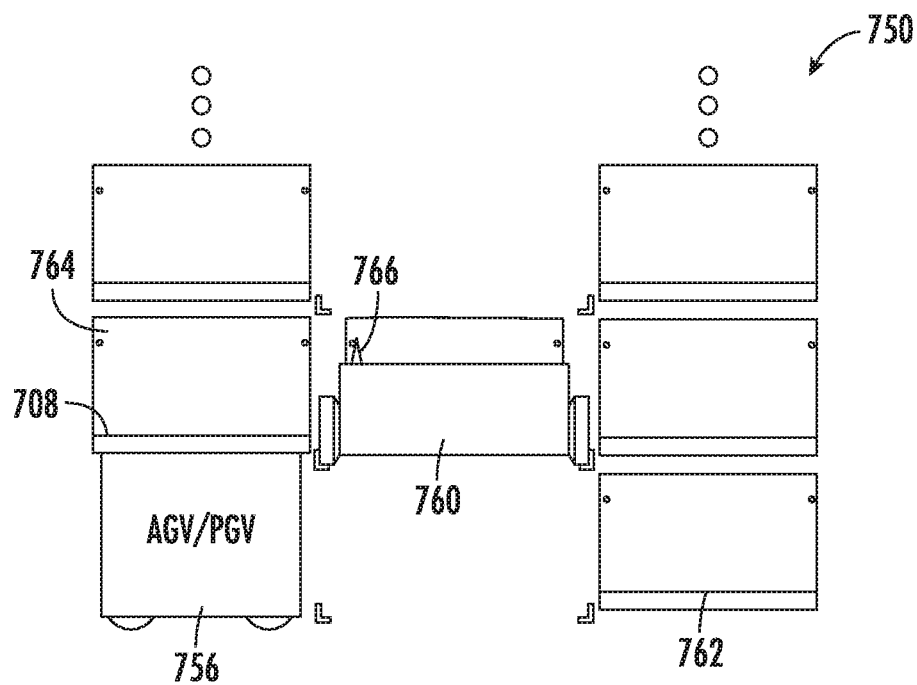
FIG. 15B shows an end view of a guided vehicle interface to storage and retrieval.

Referring now to FIG. 15A, there is shown an end view of a guided vehicle interface to storage and retrieval 750. Referring also to FIG. 15B, there is shown an end view of a guided vehicle interface to storage and retrieval 750. AGV/PGV 756 may be provided as an automated guided vehicle (AGV) or a personal guided vehicle (PGV) where AGV/PGV 756 has a passive tote support 758 and interfaces directly with bot 760 in tote storage array 762. FIG. 15A shows tote 764 on bot 760 whereas FIG. 15B shows tote 764 on AGV/PGV 756 where bot 760 is provided with shuttle or tote transfer mechanism 766, for example as disclosed in U.S. Patent Publication No. US 2017/0313514 published Nov. 2, 2017 which is incorporated by reference herein in its entirety. Here, shuttle or tote transfer mechanism 766 on bot 760 may selectively place totes to AGV/PGV 756 for removal from ASRS 762 or pick totes from AGV/PGV 756 for induction into ASRS 762. FIGS. 15A and 15B show an example of a synchronous handoff between AGV/PGV 756 and bot 760 where timing and location of the two for transfer need to be synchronously handled.

Figure 16A:
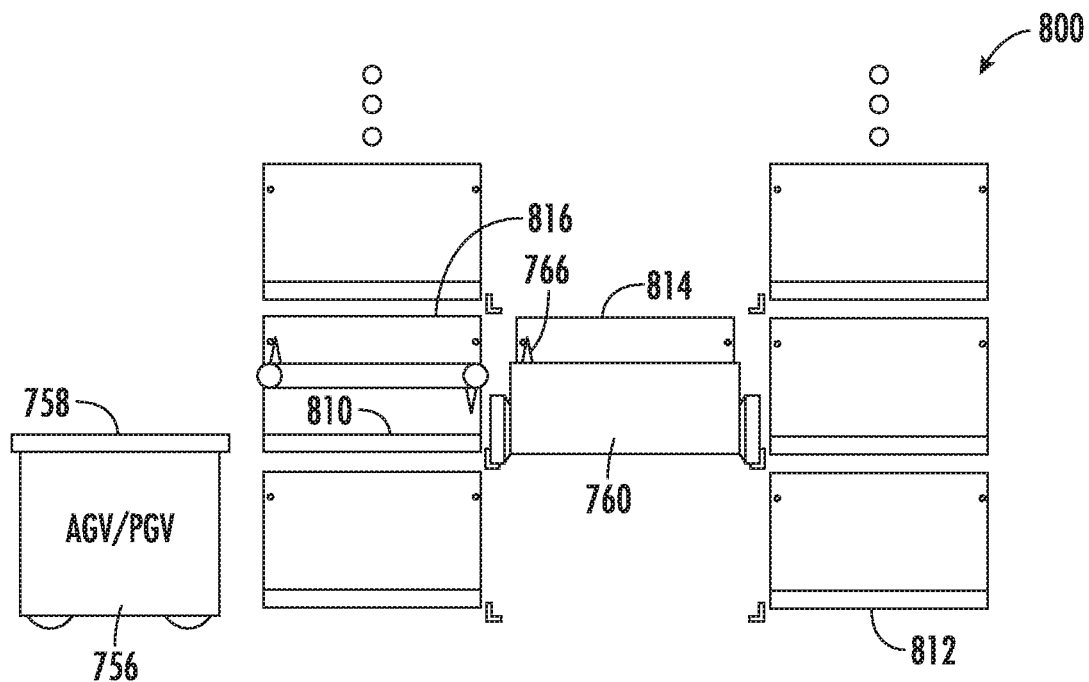
FIG. 16A shows an end view of a guided vehicle interface to storage and retrieval.
Figure 16B:
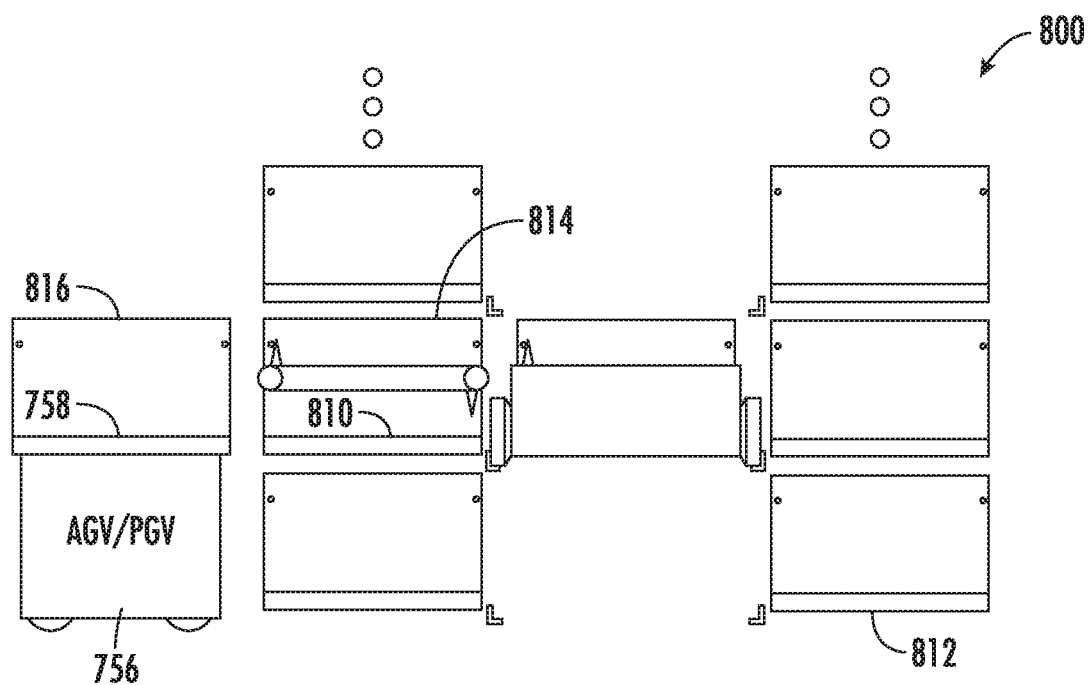
FIG. 16B shows an end view of a guided vehicle interface to storage and retrieval.

Referring now to FIG. 16A, there is shown an end view of a guided vehicle interface to storage and retrieval 800. Referring also to FIG. 16B, there is shown an end view of a guided vehicle interface to storage and retrieval 800. AGV/PGV 756 may be provided as an automated guided vehicle (AGV) or a personal guided vehicle (PGV) where AGV/PGV 756 has a passive tote support 758 and interfaces directly with active shelf 810 in tote storage array 812. FIG. 16A shows tote 814 on bot 760 and tote 816 on shelf 810 whereas FIG. 16B shows tote 816 on AGV/PGV 756 and tote 814 on shelf 810 where bot 760 is provided with shuttle or tote transfer mechanism 766 and shelf 810 is provided with shuttle or tote transfer mechanism 766 also. Here, shuttle or tote transfer mechanism 766 on bot 760 and shelf 814 may selectively place totes to shelf 810 and AGV/PGV 756 for removal from ASRS 812 or pick totes from shelf 810 and AGV/PGV 756 for induction into ASRS 812. FIGS. 16A and 16B show an example of an asynchronous handoff between AGV/PGV 756 and bot 760 where timing and location of the two for transfer need not be synchronously handled.

Figure 17A:
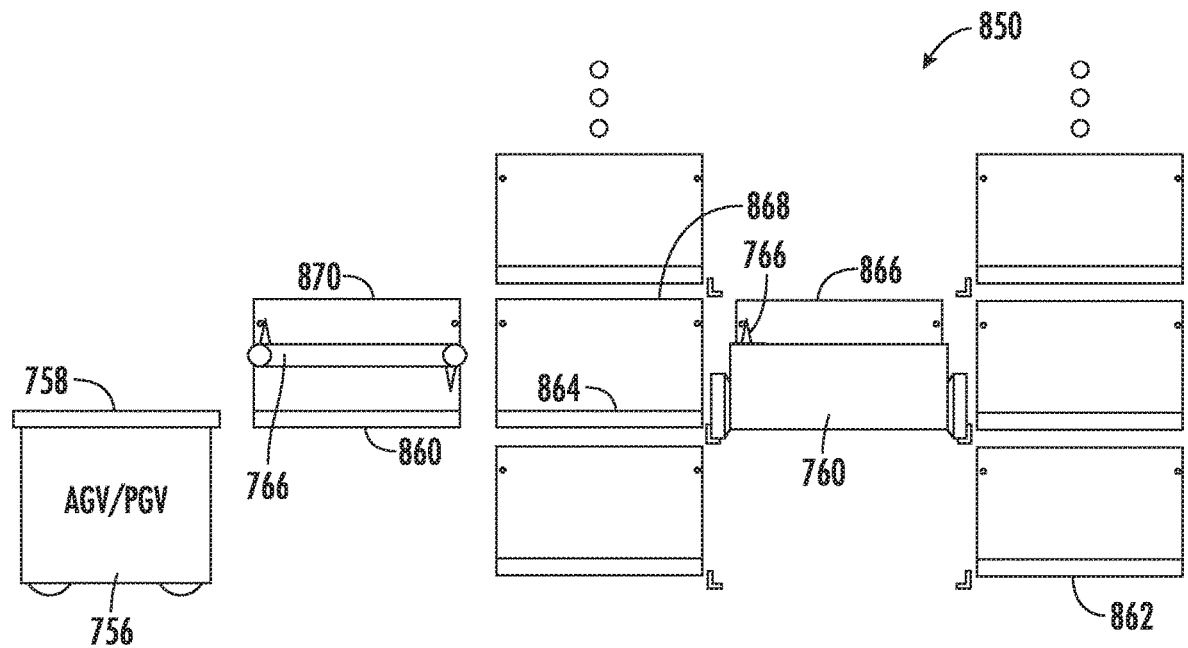
FIG. 17A shows an end view of a guided vehicle interface to storage and retrieval.
Figure 17B:
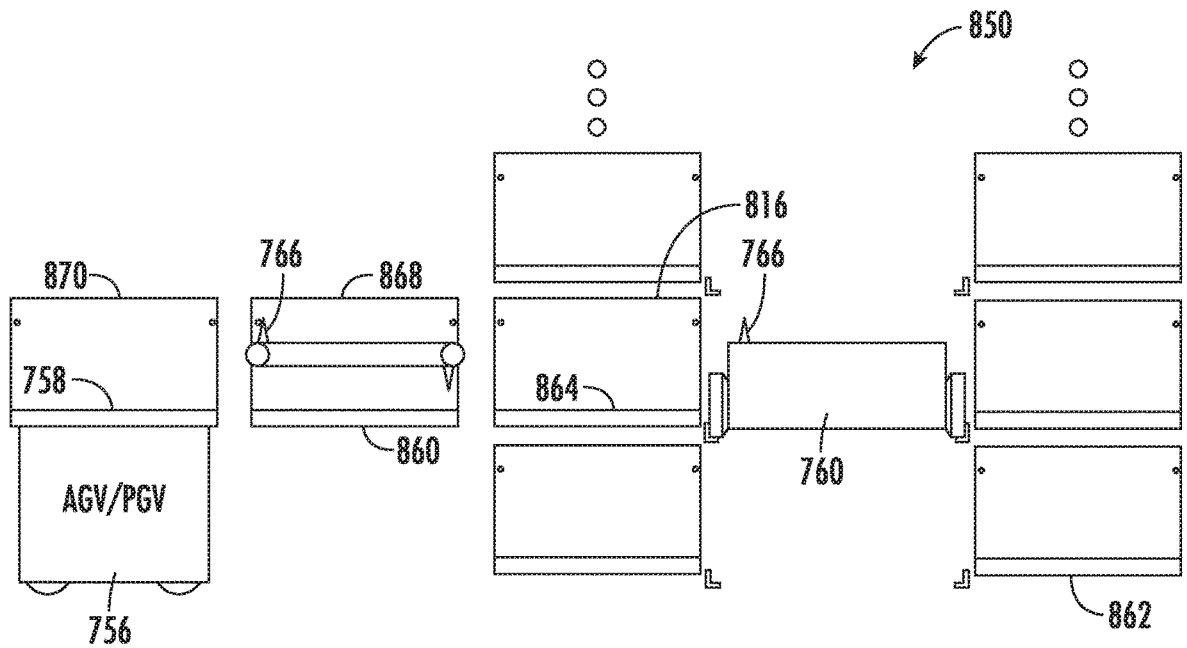
FIG. 17B shows an end view of a guided vehicle interface to storage and retrieval.

Referring now to FIG. 17A, there is shown an end view of a guided vehicle interface to storage and retrieval 850. Referring also to FIG. 17B, there is shown an end view of a guided vehicle interface to storage and retrieval 850. AGV/PGV 756 may be provided as an automated guided vehicle (AGV) or a personal guided vehicle (PGV) where AGV/PGV 756 has a passive tote support 758 and interfaces directly with active shelf 860 adjacent passive shelf 864 in tote storage array 862. FIG. 17A shows tote 866 on bot 760 and tote 868 on passive shelf 864 and tote 870 on active shelf 860 whereas FIG. 17B shows tote 870 on AGV/PGV 756 and tote 868 on active shelf 860 and tote 866 on passive shelf 864 where active shelf 860 is provided with shuttle or tote transfer mechanism 766 and bot 760 is provided with shuttle or tote transfer mechanism 766 also. Here, shuttle or tote transfer mechanism 766 on bot 760 and active shelf 860 may selectively place totes to shelf 864 and AGV/PGV 756 for removal from ASRS 862 or pick totes from shelf 864 and AGV/PGV 756 for induction into ASRS 862. FIGS. 17A and 17B show an example of an asynchronous handoff between AGV/PGV 756 and bot 760 where timing and location of the two for transfer need not be synchronously handled.

Figure 18A:
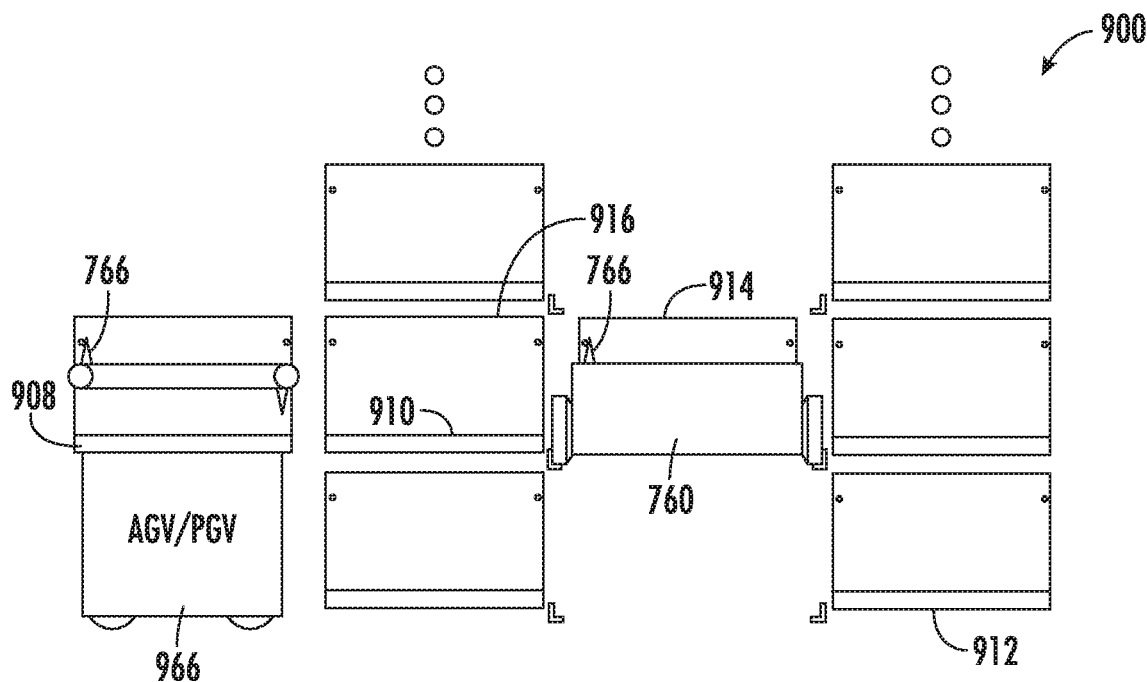
FIG. 18A shows an end view of a guided vehicle interface to storage and retrieval.
Figure 18B:
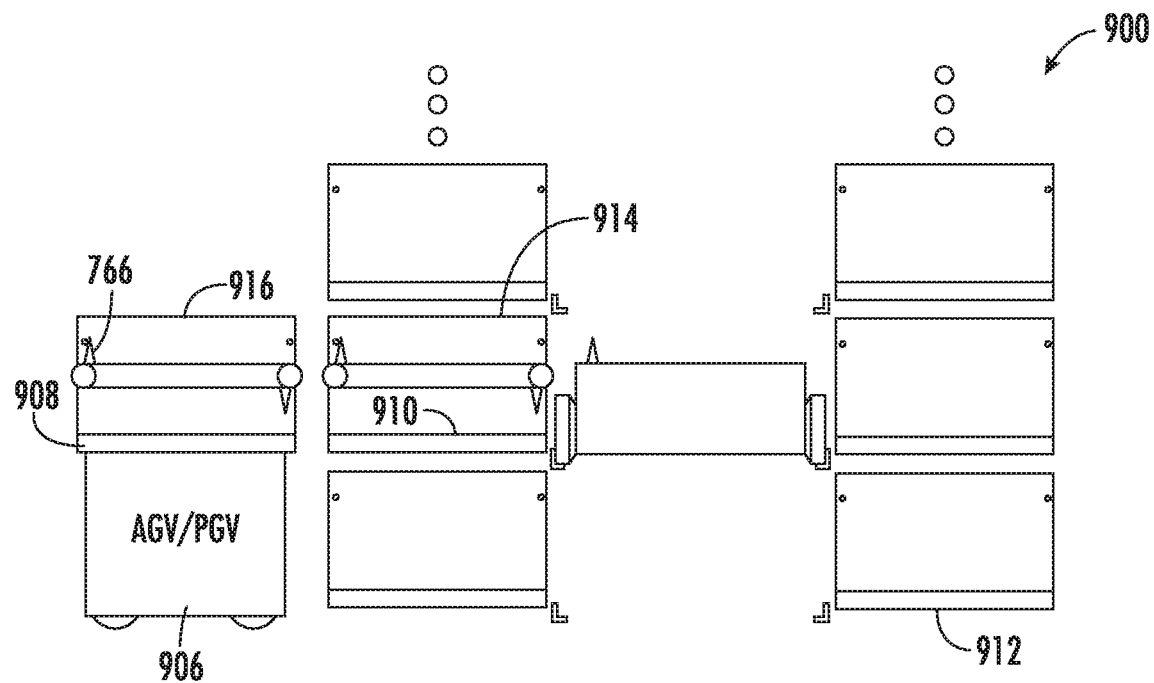
FIG. 18B shows an end view of a guided vehicle interface to storage and retrieval.

Referring now to FIG. 18A, there is shown an end view of a guided vehicle interface to storage and retrieval 900. Referring also to FIG. 18B, there is shown an end view of a guided vehicle interface to storage and retrieval 900. AGV/PGV 906 may be provided as an automated guided vehicle (AGV) or a personal guided vehicle (PGV) where AGV/PGV 906 has an active tote support 908 and interfaces directly with passive shelf 910 in tote storage array 912. FIG. 18A shows tote 914 on bot 760 and tote 916 on shelf 910 whereas FIG. 18B shows tote 916 on AGV/PGV 906 and tote 914 on shelf 910 where bot 760 is provided with shuttle or tote transfer mechanism 766 and AGV/PGV 906 is provided with shuttle or tote transfer mechanism 766 also. Here, shuttle or tote transfer mechanism 766 on bot 760 and AGV/PGV 906 may selectively place totes to shelf 910 and AGV/PGV 906 for removal from ASRS 912 or pick totes from shelf 910 and AGV/PGV 806 for induction into ASRS 912. FIGS. 18A and 18B show an example of an asynchronous handoff between AGV/PGV 906 and bot 760 where timing and location of the two for transfer need not be synchronously handled.

In accordance with an example embodiment, an apparatus may be provided comprising at least one processor and at least one non-transitory memory including computer program code, the at least one memory and the computer program code configured to, with the at least one processor, cause the apparatus to queue and schedule material through the robotic workstation.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Figure 19:
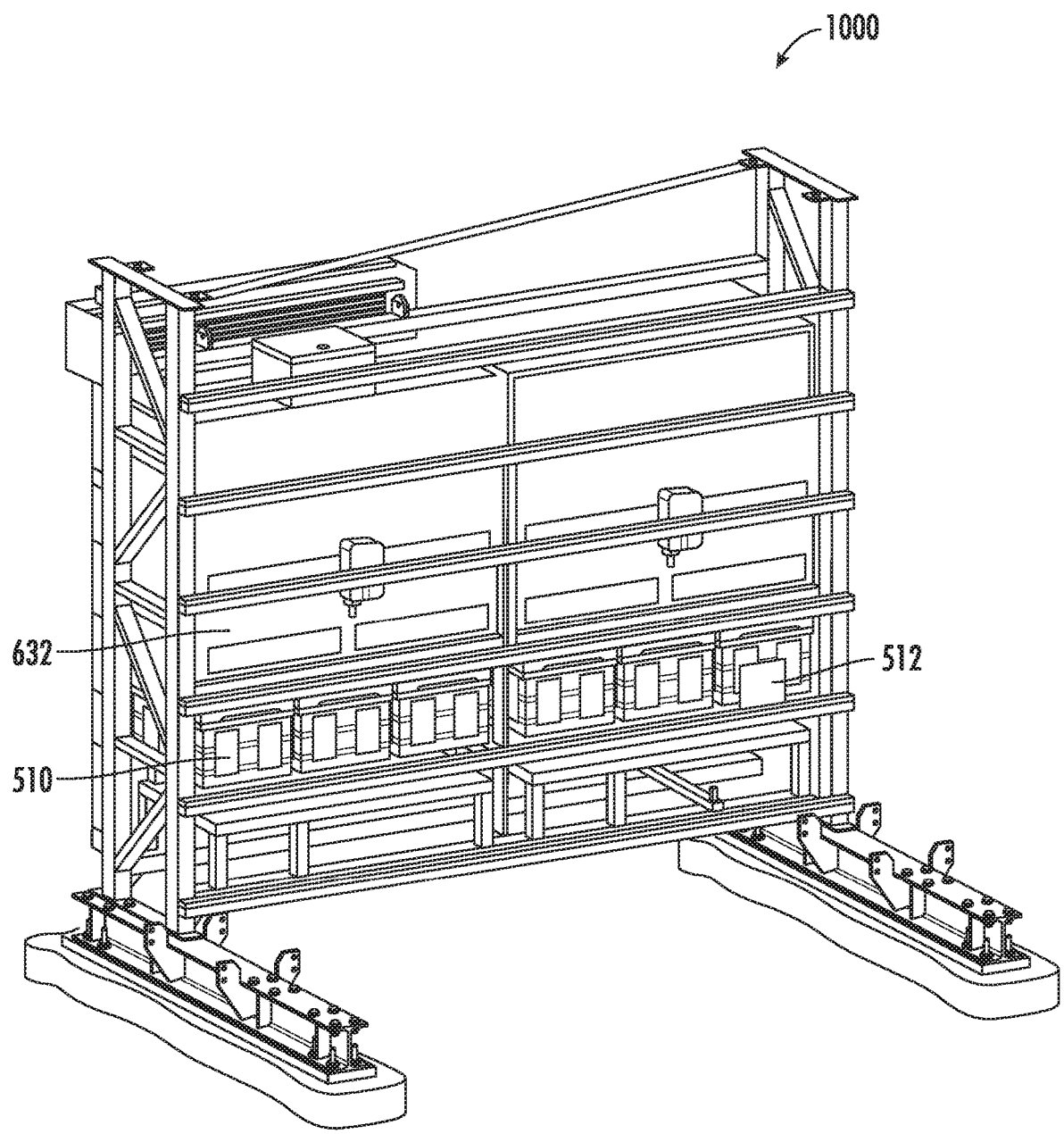
FIGS. 19-22 show perspective and cross-sectional views of further embodiments of a guided vehicle interface to storage and retrieval.
Figure 20:
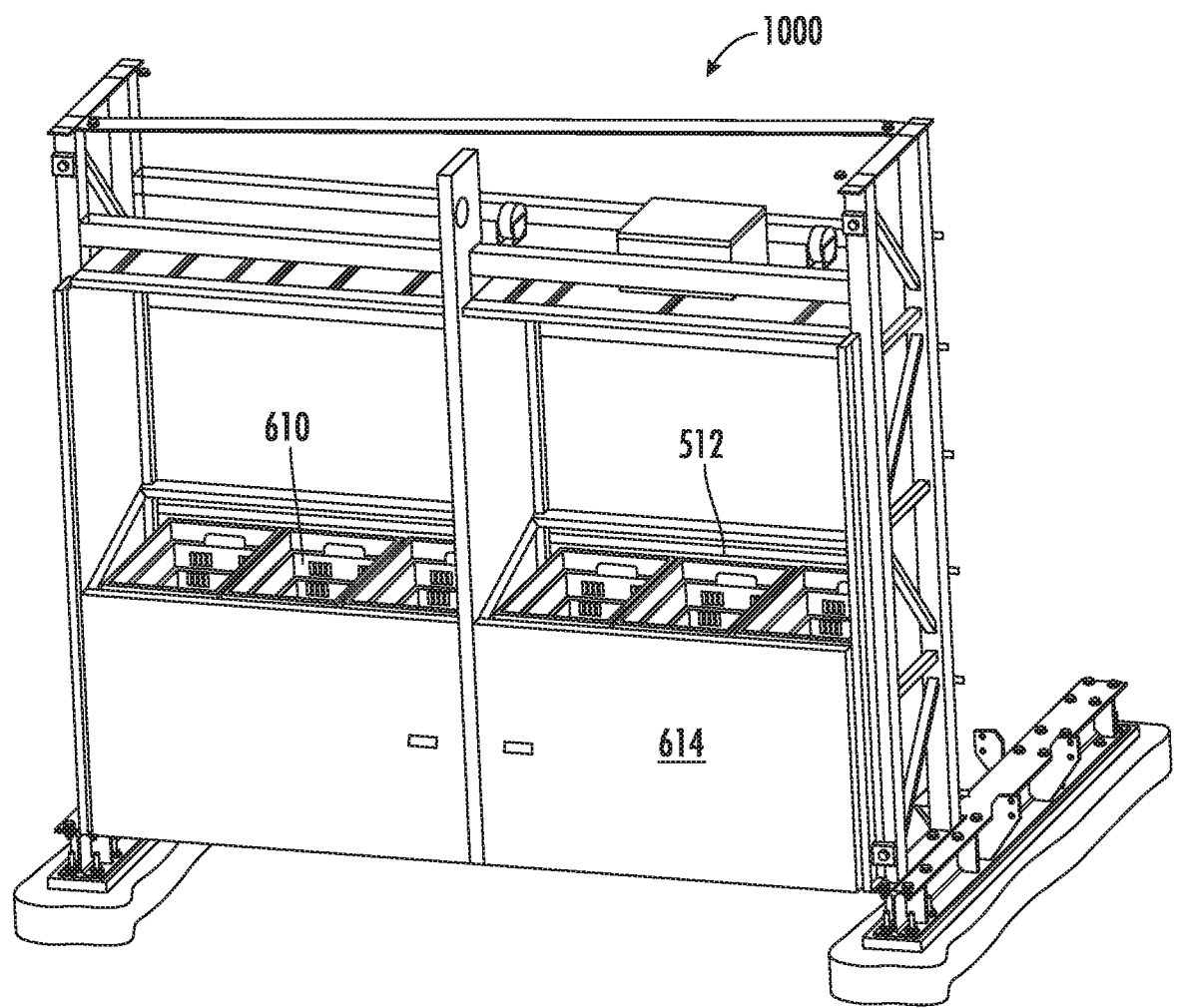
Figure 21:
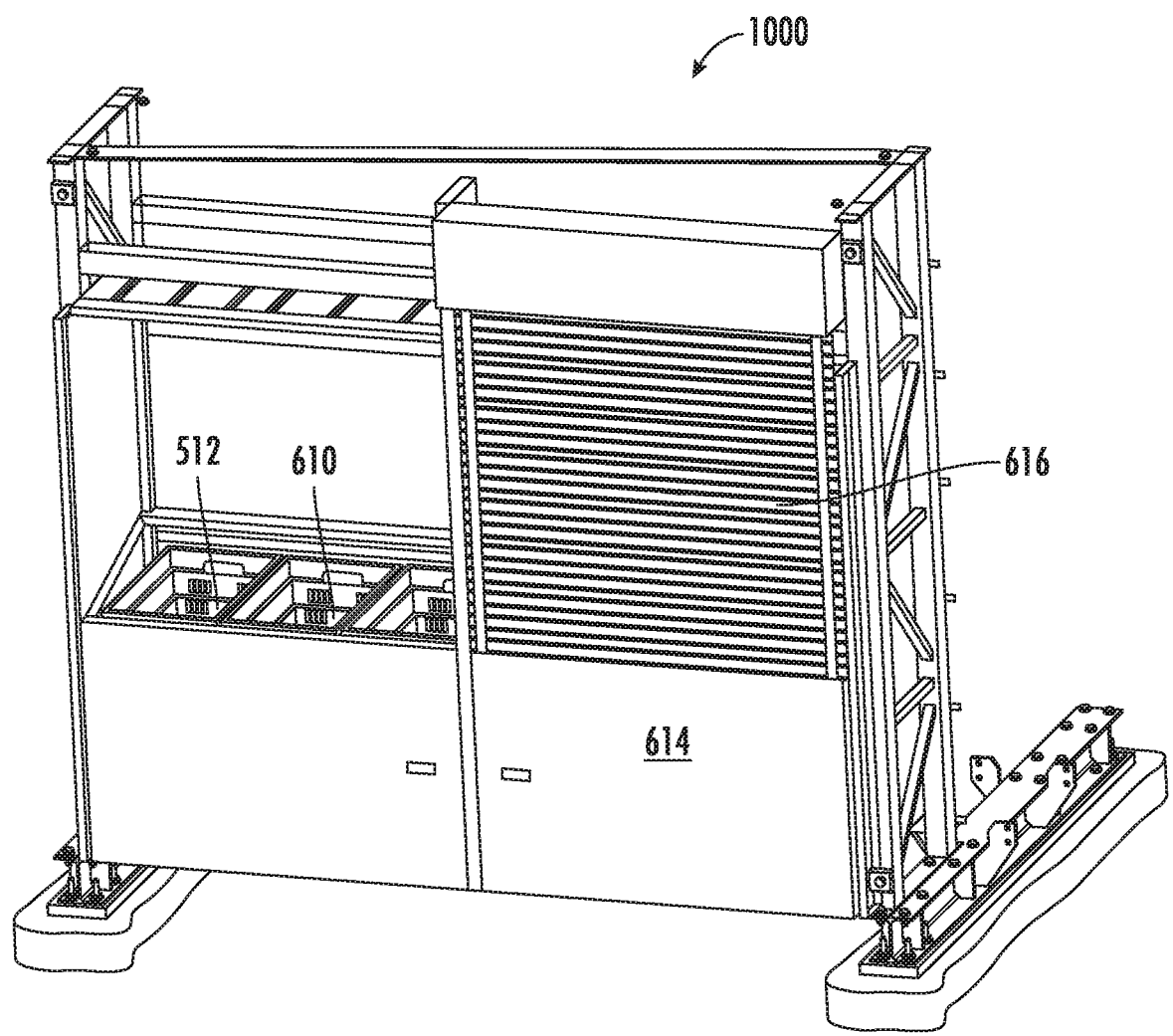
Figure 22:
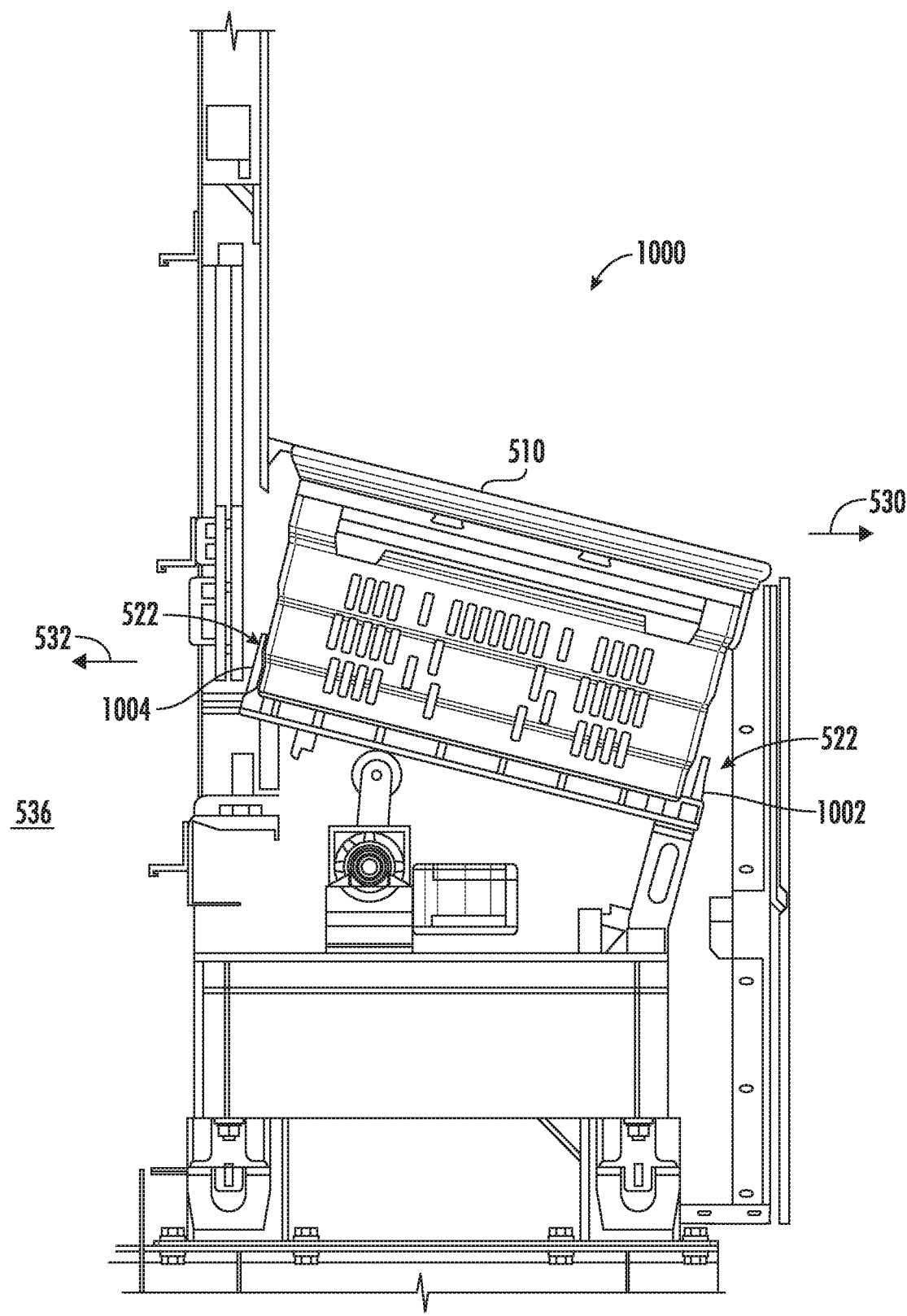

Embodiments described above include doors 514 such as shown in FIGS. 11-14 for covering the tote storage locations 512 of, for example, portal 500, 600. In embodiments, these doors 514 may be used to restrict user access to eaches within totes to those times when totes are appropriately positioned for user access. In further embodiments, the door 514 on some or all of the tote storage locations 512 may be omitted. Such embodiments are shown in FIGS. 19-22. FIG. 19 shows a view of a portal 1000 from the bot-access side. The portal includes tote storage locations 512, some of which are shown with totes 510. As described above, gates 632 may be selectably opened or closed to prevent user access to the bot side for safety or other concerns. FIG. 20 shows a view of portal 1000 from the user-access side. As seen, doors 514 (shown for example in FIG. 11) are omitted so that the totes seated on base plates 610 within each tote storage location 512 may be accessible when a user-access door 616 is open (door 616 is omitted in FIG. 20; one such door 616 is shown in FIG. 21). In such embodiments, totes may be accessed by users once the user-side doors 616 are opened. In embodiments, the user-side doors 616 may lock unless one or more totes are available for user access in tote storage locations 512. FIG. 22 shows a cross-sectional edge view of portal 1000 with the access door 514 of FIG. 13 omitted.

Embodiments of the present technology include tote retention and release mechanisms 522 (FIG. 12) including movable retention flippers as described above for retaining a tote such that the user cannot manually pull it out, or manually push it into the bot operation lane. In further embodiments, the tote retention and release mechanism 522 may be simplified so that the movable retention flippers are omitted. FIG. 22 shows tote retention and release mechanisms 522 adjacent the user-access side 530 and the bot-access side 532. In this embodiment, the tote retention and release mechanisms 522 may comprise simple stationary guides 1002, 1004 that engage the tote 510, for example at one or more edges of the tote near the bottom of the tote. The guides may comprise guides 1002 that engage the tote 510 on the user-access side to prevent the user from manually pulling a tote out of the user-side. The guides may comprise guides 1004 that engage the tote 510 on the bot-access side to prevent the user from manually pushing a tote into the bot operation lane 536. In order to remove a tote 510 from the guides 1002, a user may lift a front of the tote up off the stationary guides to enable removal of the tote 510 from the user-access side 530. Arms within the tote storage locations 512 may lift or push a rear of a tote 510 up off of the guides 1004 to enable removal of the tote 510 into the bot operation lane 536 through the tote-access side 532. The embodiment shown in FIG. 22 including passive guides 1002, 1004 may be used in embodiments not including a door 514 (as in FIG. 22), or including a door 514 (as in FIG. 13).

In embodiments, the present technology relates to an automatic storage and retrieval system, comprising: storage positions for storing containers; mobile robots for transferring containers around within the automatic storage and retrieval system; and a workstation or portal comprising: a first end at which a mobile robot enters the workstation or portal carrying a container, a second end, opposite the first end, at which the mobile robot exits the workstation or portal, a container storage structure having at least one storage shelf for storing the container, the storage shelf having a bot access side and a user access side opposing the bot access side, a tote retention and release mechanism configured to block a tote from transfer to or from the bot access side and/or block a tote from transfer to or from the user access side.

In another embodiment, the present technology relates to an automatic storage and retrieval system, including storage positions configured to receive containers from mobile robots, the automated storage and retrieval system comprising: a workstation or portal comprising: a first end at which a mobile robot enters the workstation or portal carrying a container, a second end, opposite the first end, at which the mobile robot exits the workstation or portal, a container storage structure having at least one storage shelf for receiving the container, the storage shelf having a bot access side and a user access side opposing the bot access side, and a tote retention and release mechanism, comprising: a bot access side flipper configured to move between a first position where the bot access side flipper blocks transfer of a tote to or from the bot access side, and a second position where the bot access side flipper allows transfer of a tote to or from the bot access side, and a user access side flipper configured to move between a first position where the user access side flipper blocks transfer of a tote to or from the bot access side, and a second position where the bot access side flipper allows transfer of a tote to or from the bot access side.

In another embodiment, the present technology relates to an automatic storage and retrieval system, including storage positions configured to receive containers from mobile robots, the automated storage and retrieval system comprising: a workstation or portal comprising: a container storage structure comprising at least one storage shelf for receiving the container, the at least one storage shelf comprising a bot access side at which the container may be transferred between a mobile robot and the at least one storage shelf, and the at least one storage shelf comprising a user access side at which the container may be transferred between the at least one storage shelf and positions external to the workstation, and a tote retention and release mechanism comprising a first arm adjacent the user access side and a second arm adjacent the bot access side, the first and second arms configured to move between open and closed states, wherein: the first and second arms are both open allowing movement of a container to either the user or bot access sides, the first arm blocks movement of the container to the user access side while the second arm allows movement of the container to the bot access side, the first arm allows movement of the container to the user access side while the second arm blocks movement of the container to the bot access side, the first and second arms are both closed, blocking movement of the container to both the user and bot access sides.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. It is intended that the scope of the method be defined by the claims appended hereto.

We claim:

1. An automatic storage and retrieval system, comprising: storage positions for storing containers;
mobile robots for transferring containers around within the automatic storage and retrieval system; and
a workstation or portal comprising:
a first end at which a mobile robot enters the workstation or portal carrying a container,
a second end, opposite the first end, at which the mobile robot exits the workstation or portal,
a container storage structure having at least one storage shelf for storing the container, the storage shelf having a bot access side and a user access side opposing the bot access side, an axis extending between the bot access side and the user access side, and
a tote retention and release mechanism extending along the axis between the bot access side and the user access side and configured to be positioned along at least one side of the tote parallel to the axis, the tote retention and release mechanism further configured to block a tote from transfer to or from the bot access side and/or block a tote from transfer to or from the user access side.

2. The automatic storage and retrieval system of claim 1, wherein the tote retention and release mechanism comprises a stationary guide configured to engage at least one of a front and rear side of the tote.

3. The automatic storage and retrieval system of claim 1, the tote retention and release mechanism comprises a bot access side flipper configured to selectably block a tote from transfer to or from the bot access side, and/or a user access side flipper configured to selectably block the tote from transfer to or from the user access side.

4. The automatic storage and retrieval system of claim 3, wherein the bot access side flipper blocks the tote from transfer to the bot access side when the user access side flipper allows the tote to transfer to or from the storage shelf at the user access side.

5. The automatic storage and retrieval system of claim 3, wherein the user access side flipper blocks the tote from transfer to the user access side when the bot access side flipper allows the tote to transfer to or from the storage shelf at the bot access side.

6. The automatic storage and retrieval system of claim 3, further comprising a control system for monitoring at least one of a presence of a container on the storage shelf, an identification of a container on the storage shelf, an identity of items transferred to or from the container on the storage shelf and a weight of the container.

7. The automatic storage and retrieval system of claim 6, wherein the control system controls the bot access side flipper to move between a first position where the bot access side flipper selectably blocks the tote from transfer to or from the bot access side, and a second position where the bot access side flipper allows transfer of the tote to or from the bot access side.

8. The automatic storage and retrieval system of claim 6, wherein the control system controls the user access side flipper to move between a first position where the user access side flipper selectably blocks the tote from transfer to or from the user access side, and a second position where the user access side flipper allows transfer of the tote to or from the user access side.

9. The automatic storage and retrieval system of claim 6, wherein the control system comprises a camera.

10. The automatic storage and retrieval system of claim 6, wherein the control system comprises an optical sensor.

11. The automatic storage and retrieval system of claim 6, wherein the control system further comprises state flags indicating whether the bot access side flipper and the user access side flipper are selectively blocking transfer of the tote.

12. The automatic storage and retrieval system of claim 6, wherein the control system controls the bot access side flipper and user access side flipper such that, in a first position, both flippers are closed and blocking transfer, in a second position, the bot access side flipper is open allowing transfer and the user access side flipper is closed blocking transfer, and in a third position, the bot access side flipper is closed blocking transfer and the user access side flipper is open allowing transfer.

13. The automatic storage and retrieval system of claim 3, wherein the workstation or portal allows transfer of empty totes to or from the automatic storage and retrieval system via the at least one storage shelf.

14. The automatic storage and retrieval system of claim 13, wherein the user and bot access side flippers allow transfer of empty totes into the automatic storage and retrieval system by the bot access side flipper first being closed and the user access side flipper first being open to receive an empty tote onto the at least one storage shelf, and then the bot access side flipper next being open and the user access side flipper next being closed to allow transfer of the empty tote onto a mobile robot.

15. The automatic storage and retrieval system of claim 13, wherein the user and bot access side flippers allow transfer of empty totes out of the automatic storage and retrieval system by the user access side flipper first being closed and the bot access side flipper first being open to receive an empty tote onto the at least one storage shelf, and then the user access side flipper next being open and the bot access side flipper next being closed to allow transfer of the empty tote away from the automatic storage and retrieval system.

16. The automatic storage and retrieval system of claim 1, wherein the workstation or portal allows transfer of eaches from one or more product totes on one or more storage shelves to one or more order totes on one or more storage shelves.

17. The automatic storage and retrieval system of claim 16, wherein flow of product and order totes to and from the one or more storage shelves is in part controlled by the tote retention and release mechanism on each of the one or more storage shelves.

18. The automatic storage and retrieval system of claim 16, wherein transfer of eaches from product totes to order totes on the one or more storage shelves is in part controlled by the tote retention and release mechanism on each of the one or more storage shelves.

19. An automatic storage and retrieval system, including storage positions configured to receive containers from mobile robots, the automated storage and retrieval system comprising:
a workstation or portal comprising:
a first end at which a mobile robot enters the workstation or portal carrying a container,
a second end, opposite the first end, at which the mobile robot exits the workstation or portal,
a container storage structure having at least one storage shelf for receiving the container, the storage shelf having a bot access side and a user access side opposing the bot access side,
a tote retention and release mechanism, comprising:
a bot access side flipper configured to move between a first position where the bot access side flipper blocks transfer of a tote to or from the bot access side, and a second position where the bot access side flipper allows transfer of a tote to or from the bot access side, and
a user access side flipper configured to move between a first position where the user access side flipper blocks transfer of a tote to or from the user access side, and a second position where the user access side flipper allows transfer of a tote to or from the user access side, and
an actuator for moving the user and bot access side flippers between their first and second positions, the actuator configured to translate;
wherein translation of the actuator bar provides at least three different states of the user and bot access side flippers, the at least three different states comprising:
the user access side flipper blocks movement of the container to the user access side while the bot access side flipper allows movement of the container to the bot access side, the user access side flipper allows movement of the container to the user access side while the bot access side flipper blocks movement of the container to the bot access side,
the user and bot access side flipper are both closed, blocking movement of the container to both the user and bot access sides; and
wherein a translational position of the actuator determines which state of the four different states the user and bot access side flippers are in.

20. The automatic storage and retrieval system of claim 19, further comprising a motor and a control system, wherein the actuator is driven to translate by the motor, under the control of the control system.

21. The automatic storage and retrieval system of claim 19, further comprising a first cam on which the user access side flipper is mounted, a second cam on which the bot access side flipper is mounted, a first pin on the actuator bar configured to engage the first cam, and a second pin on the actuator bar configured to engage the second cam, wherein engagement of the first pin with the first cam as the actuator bar translates moves the access side flipper between the first and second positions.

22. The automatic storage and retrieval system of claim 21, wherein engagement of the second pin with the second cam as the actuator bar translates moves the bot side flipper between the first and second positions.

23. An automatic storage and retrieval system, including storage positions configured to receive containers from mobile robots, the automated storage and retrieval system comprising:
a workstation or portal comprising:
a container storage structure comprising at least one storage shelf for receiving a container of the containers, the at least one storage shelf comprising a bot access side at which the container may be transferred between a mobile robot and the at least one storage shelf, and the at least one storage shelf comprising a user access side at which the container may be transferred between the at least one storage shelf and positions external to the workstation, and
a tote retention and release mechanism comprising a first arm adjacent the user access side and a second arm adjacent the bot access side, the first and second arms configured to move between open and closed positions, wherein:
in a first state, the first arm blocks movement of the container to the user access side while the second arm allows movement of the container to the bot access side,
in a second state, the first arm allows movement of the container to the user access side while the second arm blocks movement of the container to the bot access side,
in a third state, the first and second arms are both closed, blocking movement of the container to both the user and bot access sides; and
a door configured to prevent user access to the container through the user access side when the door is in the closed position.

24. The automatic storage and retrieval system of claim 23, further comprising a controller for controlling whether the first arm is in an open or closed state, and for controlling whether the second arm is in an open or closed state.

* * * * *

UNITED STATES PATENT AND TRADEMARK OFFICE
CERTIFICATE OF CORRECTION

| | |
|---|---|
| PATENT NO. | : 11,267,651 B2 |
| APPLICATION NO. | : 16/742119 |
| DATED | : March 8, 2022 |
| INVENTOR(S) | : Fosnight et al. |

It is certified that error appears in the above-identified patent and that said Letters Patent is hereby corrected as shown below:

On the Title Page

Inventors (Item (72)):
Please change:
"Inventors:
William J. Fosnight, Windham, NH (US); Devin Lert, Wakefield, MA (US); John G. Lert, Jr., Wakefield, MA (US); Stephanie Waite, Burlington, MA (US); Julian Warhurst, Portsmouth, RI (US); David Hartnett, Tewksbury, MA (US)"
To:
--Inventors:
William J. Fosnight, Windham, NH (US); Devin Lert, Wakefield, MA (US); John G. Lert, Jr., Wakefield, MA (US); Stephanie Waite, Burlington, MA (US); Julian Warhurst, Portsmouth, RI (US); David Hartnett, Tewksbury, MA (US); Bryce Germain, Waltham, MA (US)--

Signed and Sealed this
First Day of October, 2024

Katherine Kelly Vidal
*Director of the United States Patent and Trademark Office*